(12) United States Patent
Luo et al.

(10) Patent No.: US 12,149,872 B2
(45) Date of Patent: Nov. 19, 2024

(54) CAMERA MODULE, IMAGING METHOD, AND IMAGING APPARATUS

(71) Applicant: Huawei Technologies Co., Ltd., Shenzhen (CN)

(72) Inventors: Wei Luo, Shanghai (CN); Yifan Wang, Shenzhen (CN); Wei Tang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 17/791,471

(22) PCT Filed: Nov. 16, 2020

(86) PCT No.: PCT/CN2020/128975
§ 371 (c)(1),
(2) Date: Jul. 7, 2022

(87) PCT Pub. No.: WO2021/139401
PCT Pub. Date: Jul. 15, 2021

(65) Prior Publication Data
US 2023/0045724 A1 Feb. 9, 2023

(30) Foreign Application Priority Data
Jan. 8, 2020 (CN) .................. 202010018843.X

(51) Int. Cl.
*H04N 9/64* (2023.01)
*G02B 5/20* (2006.01)
(Continued)

(52) U.S. Cl.
CPC ............. *H04N 9/64* (2013.01); *H04N 23/667* (2023.01); *H04N 23/80* (2023.01); *H04N 23/84* (2023.01); *H04N 25/131* (2023.01); *G02B 5/208* (2013.01); *G02B 5/281* (2013.01); *G02B 26/001* (2013.01); *G02F 1/11* (2013.01)

(58) Field of Classification Search
CPC ...... H04N 9/64; H04N 23/667; H04N 23/131; H04N 23/80; H04N 23/84
See application file for complete search history.

(56) References Cited

U.S. PATENT DOCUMENTS 3,971,065 A 7/1976 Bayer
7,655,898 B2 2/2010 Miller
(Continued)

FOREIGN PATENT DOCUMENTS

CN 1586068 A 2/2005
CN 202600333 U 12/2012
(Continued)

*Primary Examiner* — On S Mung
(74) *Attorney, Agent, or Firm* — Slater Matsil, LLP

(57) ABSTRACT

This application provides a camera module, an imaging method, and an imaging apparatus. The camera module in this application includes a filter module and a sensor module. The filter module is configured to output target optical signals of different bands in optical signals incident on the filter module to a same pixel on the sensor module at different times. The sensor module is configured to: convert the target optical signals incident on the sensor module into electrical signals, and output the electrical signals.

20 Claims, 27 Drawing Sheets

(51) Int. Cl.
　　*G02B 5/28*　　(2006.01)
　　*G02B 26/00*　(2006.01)
　　*G02F 1/11*　　(2006.01)
　　*H04N 23/667*　(2023.01)
　　*H04N 23/80*　(2023.01)
　　*H04N 23/84*　(2023.01)
　　*H04N 25/131*　(2023.01)

(56) References Cited

U.S. PATENT DOCUMENTS

| | | | |
|---|---|---|---|
| 8,130,380 | B2 | 3/2012 | Saari |
| 9,426,362 | B2 | 8/2016 | Tang et al. |
| 2008/0309801 | A1* | 12/2008 | Cuccias ............... H04N 23/63 348/242 |
| 2011/0074992 | A1 | 3/2011 | Ajito et al. |
| 2013/0229646 | A1 | 9/2013 | Sakurai |
| 2014/0125825 | A1 | 5/2014 | Baer et al. |
| 2015/0130962 | A1 | 5/2015 | Hiramoto |
| 2017/0163951 | A1 | 6/2017 | Getman et al. |
| 2017/0316547 | A1* | 11/2017 | Mendlovic ........... H04N 23/843 |

FOREIGN PATENT DOCUMENTS

| | | |
|---|---|---|
| CN | 103698010 A | 4/2014 |
| CN | 104159049 A | 11/2014 |
| CN | 105467490 A | 4/2016 |
| CN | 105987754 A | 10/2016 |
| CN | 106657802 A | 5/2017 |
| CN | 107395940 A | 11/2017 |
| CN | 107561684 A | 1/2018 |
| CN | 207164435 U | 3/2018 |
| CN | 108449531 A | 8/2018 |
| CN | 108827886 A | 11/2018 |
| CN | 109115339 A | 1/2019 |
| CN | 209182232 U | 7/2019 |
| CN | 110595616 A | 12/2019 |
| EP | 2920562 A1 | 9/2015 |
| JP | 2009121986 A | 6/2009 |
| JP | 2017208651 A | 11/2017 |
| JP | 2018195961 A | 12/2018 |
| WO | 2014078426 A1 | 5/2014 |

* cited by examiner

CAMERA MODULE, IMAGING METHOD, AND IMAGING APPARATUS

CROSS-REFERENCE TO RELATED APPLICATIONS

This application is a national stage of International Application No. PCT/CN2020/128975, filed on Nov. 16, 2020, which claims priority to Chinese Patent Application No. 202010018843.X, filed on Jan. 8, 2020. Both of the aforementioned applications are hereby incorporated by reference in their entireties.

TECHNICAL FIELD

This application relates to the image processing field, and more specifically, to a camera module, an imaging method, and an imaging apparatus.

BACKGROUND

An image sensor is one of main components of a terminal photographing system, and plays a decisive role in imaging quality. Currently, a commonly used color imaging sensor is a Bayer sensor. To obtain a full-color image, the Bayer sensor needs perform interpolation and supplement by using a demosaicing algorithm. This causes a reduction in image resolution. In addition, problems such as a moiré pattern, color noise, and zippering noise are often caused in the interpolation process, and therefore imaging quality is degraded.

With development and popularization of intelligent terminal technologies, people have growing requirements on photographing experience of intelligent terminals. Users expect to obtain higher photographing quality.

Therefore, how to improve imaging quality of an image becomes a problem that urgently needs to be resolved.

SUMMARY

This application provides a camera module, an imaging method, and an imaging apparatus, to improve imaging quality of an image.

According to a first aspect, this application provides a camera module. The camera module includes a filter module and a sensor module. The filter module is configured to output target optical signals of different bands in optical signals incident on the filter module to a same pixel on the sensor module at different times. The sensor module is configured to: convert the target optical signals incident on the sensor module into electrical signals, and output the electrical signals.

In the camera module provided in this application, the filter module obtains target optical signals of different bands by performing filtering through time division, and the sensor performs optical-to-electrical conversion on these different bands through time division. In comparison with the conventional technology in which optical signals of a plurality of bands are simultaneously collected and interpolation and supplement are performed by using a demosaicing algorithm to obtain a full-color image, image resolution and imaging color restoration accuracy are increased, and problems such as a moiré pattern, color noise, and zippering noise can be further avoided.

In some possible implementations, the filter module includes a movement module and a plurality of filters. The filter is configured to output a target optical signal in optical signals incident on the filter. Bands of target optical signals output by different filters in the plurality of filters are different. The movement module is configured to move, at different times, different filters in the plurality of filters to target positions at which optical signals can be received.

In other possible implementations, the filter module includes a movement module and a linear graded interferometric filter. The movement module is configured to move, at different times, different parts of the linear graded interferometric filter to target positions at which optical signals can be received. Bands of target optical signals output by different parts of the filter fail.

Optionally, the filter is continuously tunable from visible light to infrared light.

In other possible implementations, the filter module includes two two-sided reflectors and a movement module. The movement module is configured to adjust a distance between the two two-sided reflectors, so that distances between the two two-sided reflectors are different at different times. The two two-sided reflectors are configured to: obtain, through filtering, a target optical signal incident on one of the two-sided reflectors, and output the target optical signal from the other one of the two two-sided reflectors. Bands of the target optical signal are different when distances between the two-sided reflectors are different.

In other possible implementations, the filter module includes a liquid crystal tunable filter. Optionally, the filter module is one of a plurality of filter modules of the camera module.

In other possible implementations, the filter module includes an acousto-optic tunable filter.

In any one of the first aspect and the foregoing possible implementations, optionally, the filter module further includes an infrared cut-off filter, and the infrared cut-off filter is configured to filter out infrared light in the target optical signal before the target optical signal is incident on the sensor module. The infrared light in the target optical signal is filtered out, so that a photosensitive band of the sensor is closer to a photosensitive band of human eyes, and finally an image or a video is closer to a habit of viewing an object by human eyes.

In any one of the first aspect and the foregoing possible implementations, optionally, the camera module further includes a first lens module. The first lens module is configured to output an optical signal incident on the first lens module to the filter module. The first lens module can reduce a problem of a color deviation generated by the filter module in a case of large-angle incidence, and also ensure that more optical signals are incident on the sensor module, so that imaging quality can be further improved.

Optionally, the first lens module includes one or more of the following: a plastic lens, a glass lens, a diffractive optical element DOE, a metalens, and the like.

Optionally, the camera module further includes a motor module. The motor module is configured to control the first lens module and/or the sensor module to move, to implement a focusing function and/or an image stabilization function of the camera module.

Optionally, the camera module further includes a second lens module, and the second lens module is located between the filter module and the sensor module. The second lens module is configured to: output the target optical signal output by the filter to the sensor module, and increase coverage of the target optical signal on the sensor module.

The second lens module can increase an incident angle of the target optical signal output by the filter module on the sensor module, to increase coverage of the target optical signal on the sensor module. In other words, the second lens module can enable the sensor module to collect more target optical signals at the same time, to provide more raw image data, so that imaging quality can be improved.

In any one of the first aspect and the foregoing possible implementations, optionally, the camera module further includes a second lens module, and the second lens module is located between the filter module and the sensor module. The second lens module is configured to: output the target optical signal output by the filter to the sensor module, and increase coverage of the target optical signal on the sensor module.

Optionally, the camera module further includes a second motor module. The second motor module is configured to control the second lens module and/or the sensor module to move, to implement a focusing function and/or an image stabilization function of the camera module.

Optionally, the camera module further includes a first lens module. The first lens module is configured to output an optical signal incident on the first lens module to the target position on the filter module.

Optionally, the second lens module includes one or more of the following: a plastic lens, a glass lens, a diffractive optical element DOE, a metalens, and the like.

In any one of the first aspect and the foregoing possible implementations, optionally, the sensor module includes a full-band pass sensor or a broadband pass sensor.

According to a second aspect, this application provides an imaging method. The imaging method includes: obtaining a plurality of groups of raw image data, where the plurality of groups of raw image data are raw image data obtained by a camera module by performing optical-to-electrical conversion on target optical signals that are of different bands and that are collected at different times; and performing color tuning processing on the plurality of groups of raw image data to obtain a color image, where different groups of raw image data in the plurality of groups of raw image data correspond to target optical signals of different bands.

In the imaging method of this application, demosaicing processing is not performed in an entire ISP color pipeline, so that resolution is effectively increased, and a moiré pattern is avoided. Fine raw image data and a high-dimensional CCM matrix ensure multi-degree of freedom in color tuning and ensure color restoration accuracy.

In some possible implementations, the performing color tuning processing on the plurality of groups of raw image data collected by the camera module includes: performing white balance, color restoration, gamma correction, and three-dimensional look-up processing on the plurality of groups of raw image data.

According to a third aspect, this application provides an imaging apparatus. The imaging apparatus includes modules configured to implement the imaging method according to the second aspect. These modules may be implemented by using hardware or software.

According to a fourth aspect, an imaging apparatus is provided. The apparatus includes: a memory, configured to store a program; and a processor, configured to execute the program stored in the memory. When the program stored in the memory is executed, the processor is configured to perform the method according to the first aspect.

Optionally, the imaging apparatus further includes a communications interface, and the communications interface is configured to exchange information with a camera module or another apparatus.

Optionally, the imaging apparatus further includes a transceiver, and the transceiver is configured to exchange information with a camera module or another apparatus.

According to a fifth aspect, this application provides a method for adjusting a spectral mode of a camera module. The method includes: receiving first information, where the first information is used to indicate to set the spectral mode of the camera module; and outputting mode information of each of a plurality of spectral modes in response to the first information, where the mode information of each spectral mode includes name information of the spectral mode.

Optionally, the plurality of spectral modes include at least one of the following: a normal mode, a high-precision mode, a dark mode, a print mode, and an expert mode.

In some possible implementations, the method further includes: receiving second information, where the second information is used to indicate to set the spectral mode of the camera module to a target spectral mode in the plurality of spectral modes; and setting the spectral mode of the camera module to the target spectral mode in response to the second information.

According to a sixth aspect, this application provides an apparatus. The apparatus includes modules configured to implement the method according to the fifth aspect. These modules may be implemented by using hardware or software.

According to a seventh aspect, an apparatus is provided. The apparatus includes: an input unit, configured to receive information entered by a user; a memory, configured to store a program; an output unit, configured to output information to the user; and a processor, configured to execute the program stored in the memory. When the program stored in the memory is executed, the processor is configured to perform the method according to the fifth aspect.

The input unit may be a touchscreen, a microphone, a mouse, a keyboard, a camera, or another apparatus that can sense user input. The output unit may be an apparatus such as a display screen or a loudspeaker.

According to an eighth aspect, this application provides an imaging system. The imaging system includes one or more of the following apparatuses: the camera module according to the first aspect, the imaging apparatus according to the third aspect or the fourth aspect, and the apparatus according to the sixth aspect or the seventh aspect.

According to a ninth aspect, this application provides a computer-readable storage medium. The computer-readable storage medium stores instructions to be executed by an imaging apparatus, and the instructions are used to perform the imaging method according to the second aspect.

According to a tenth aspect, this application provides a computer-readable storage medium. The computer-readable storage medium stores instructions to be executed by an imaging apparatus, and the instructions are used to perform the method according to the fifth aspect.

According to an eleventh aspect, a computer program product including instructions is provided. When the computer program product runs on a computer, the computer performs the imaging method according to the second aspect.

According to a twelfth aspect, a computer program product including instructions is provided. When the computer program product runs on a computer, the computer performs the imaging method according to the fifth aspect.

According to a thirteenth aspect, a chip is provided. The chip includes a processor and a data interface, and the processor reads, by using the data interface, instructions stored in a memory, to perform the method according to the second aspect.

According to a fourteenth aspect, a chip is provided. The chip includes a processor and a data interface, and the processor reads, by using the data interface, instructions stored in a memory, to perform the method according to the fifth aspect.

DETAILED DESCRIPTION OF ILLUSTRATIVE EMBODIMENTS

The following first describes an imaging principle: An optical image generated from a scene by using a lens is projected onto a surface of an image sensor. The image sensor converts an optical signal into an electrical signal, analog-to-digital conversion processing is performed on the electrical signal to obtain a digital image signal, the digital image signal is processed by a processor, and then a processed image is transmitted to a display for view.

Most colors in the nature are usually obtained by mixing several monochrome colors such as three primary colors of red, green, and blue based on a specific proportion. Therefore, to obtain a color image, monochrome images of several primary colors need to be obtained first, and then the monochrome images are mixed based on a specific proportion to obtain the color image.

Figure 38:
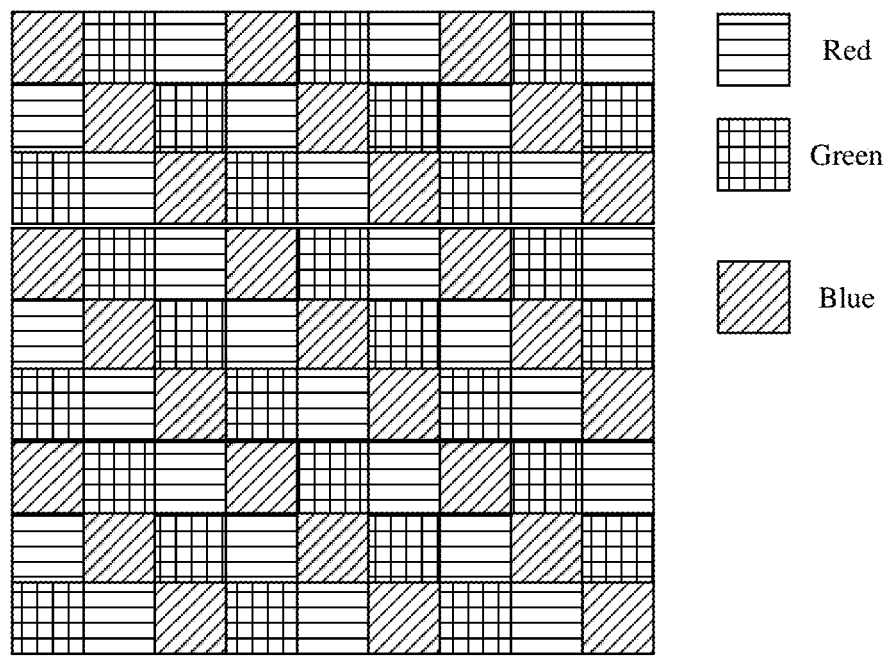
FIG. 38 is a schematic diagram of a structure of a Bayer array filter according to an embodiment of this application.

With reference to FIG. 38, the following uses an example in which monochrome colors are three primary colors of red, green, and blue, to describe an implementation of obtaining monochrome images of a scene based on a Bayer array filter. As shown in FIG. 38, in the Bayer array filter, a sensor of red, green, and blue band light is arranged in a chessboard shape. Therefore, in images obtained after a scene is projected onto the sensor by using the Bayer array filter, three colors of red, green, and blue are arranged in a chessboard shape, and monochrome images corresponding to the three colors of red, green, and blue are shown in FIG. 39.

Figure 39:
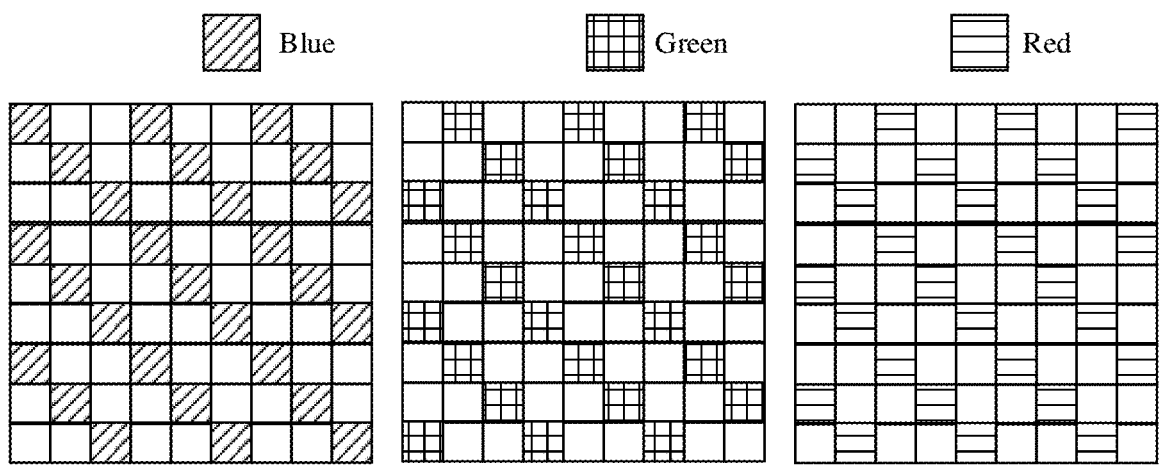
FIG. 39 is a schematic diagram of a monochrome image according to an embodiment of this application.
Figure 40:
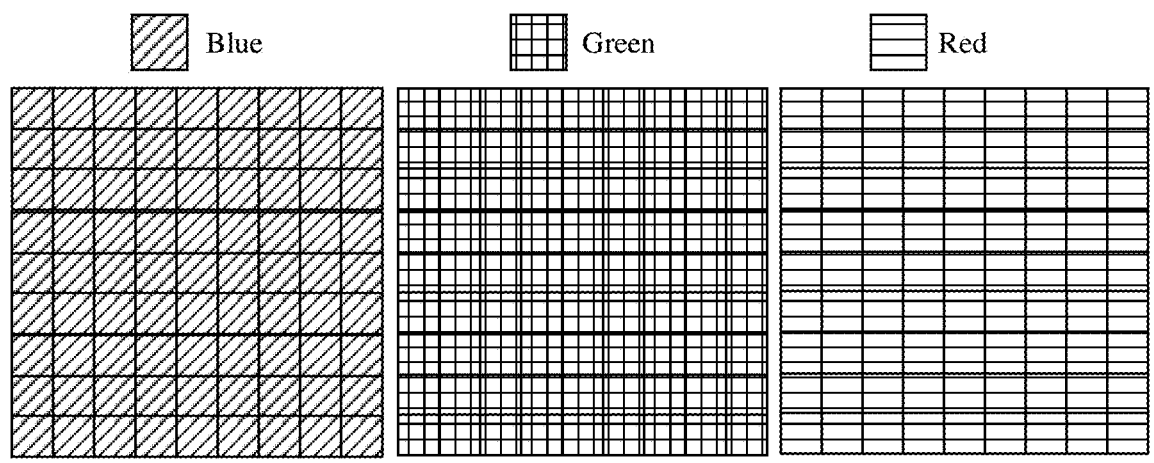
FIG. 40 is a schematic diagram of a monochrome image according to another embodiment of this application.

As shown in FIG. 39, each monochrome image includes only a part of data. To obtain complete monochrome images of red, green, and blue, an interpolation operation needs to be performed on a monochrome color based on each monochrome image shown in FIG. 39, to obtain complete monochrome images that are shown in FIG. 40 and that respectively include only red, green, and blue.

A color image restored from the three monochrome images obtained through the interpolation operation has relatively low resolution. In addition, problems such as a moiré pattern, color noise, and zippering noise are further caused in the interpolation process, and therefore imaging quality is also degraded.

To improve imaging quality of an image, this application provides a new filter, a camera module, an imaging system, and an imaging method.

Figure 1:
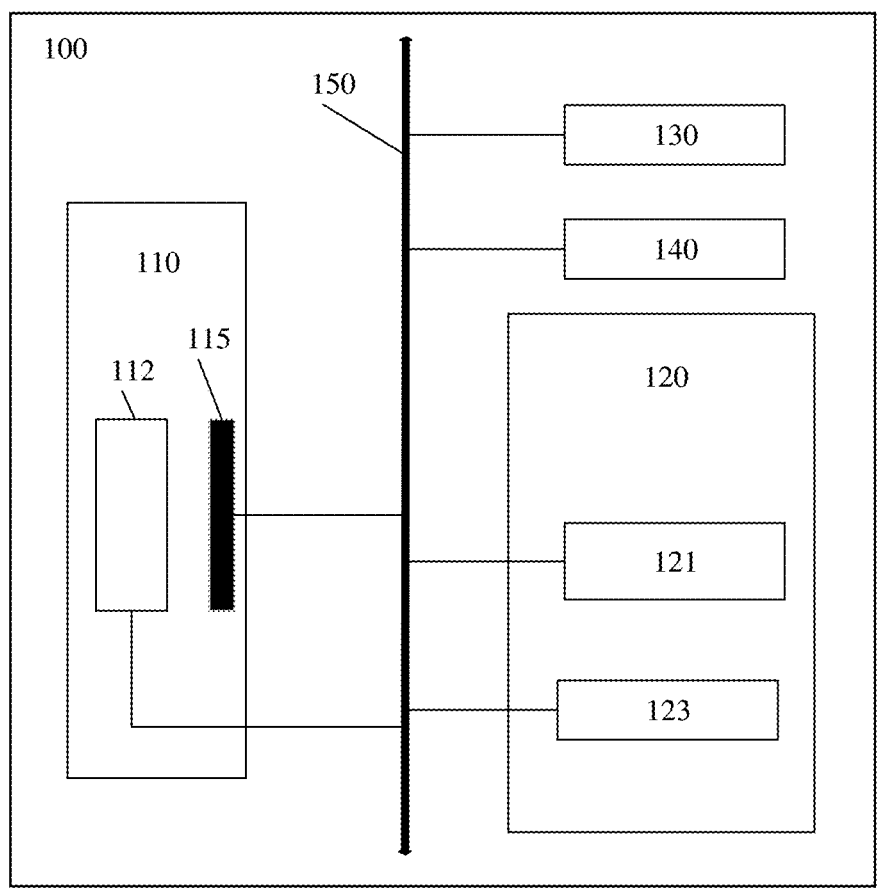
FIG. 1 is a schematic diagram of an architecture of an imaging system according to an embodiment of this application.

FIG. 1 is a schematic diagram of an architecture of an imaging system 100 according to an embodiment of this application. The imaging system 100 may include a camera module no and a processing module 120. Optionally, the imaging system 100 may further include a storage module 130 and a display module 140.

The camera module no may include a filter module 112 and a sensor module 115. The processing module 120 may include an image signal processor 121 and a filter control unit 123. The filter module 112, the filter control unit 123, the sensor module 115, the image signal processor 121, the storage module 130, and the display module 140 communicate with each other, in other words, transmit signals or data, by using a bus system 150.

The filter module 112 is configured to: receive a control signal output by the filter control unit 123, and output optical signals of different bands in incident light to a same pixel on the sensor module at different times under control of the control signal. The optical signals output by the filter module 112 include an optical signal of a band required for completing imaging by the imaging system 100. For example, when a spectral mode of the imaging system 100 is an RGB mode, required bands include red, green, and blue bands; when a spectral mode of the imaging system 100 is an RYB mode, required bands include red, yellow, and blue bands; when a spectral mode of the imaging system 100 is an RWB mode, required bands include red and blue bands and a full band; when a spectral mode of the imaging system 100 is an RGBW mode, required bands include red, green, and blue bands and a full band; and in other special spectral modes, required bands may include a near infrared light band in addition to a visible light band. For ease of description, the optical signal of the required band is referred to as a target optical signal.

Optionally, the filter module 112 may include but is not limited to the following tunable filters: a microelectromechanically driven interferometric thin film filter, a liquid crystal modulation-based tunable filter, an acousto-optic tunable filter (AOTF)-based tunable filter, a Fabry-Pérot (fabry-pérot cavity, FP) cavity-based interferometric tunable filter, and a magneto-optic effect-based tunable filter. An example structure of the filter module 112 is described in detail later.

The sensor module 115 is configured to: convert, into electrical signals, optical signals incident through the filter module 112, and output the electrical signals. A process in which the sensor module 115 converts the optical signal into the electrical signal may also be referred to as photosensitive imaging. A process in which the sensor module 115 continuously converts optical signals into electrical signals may be referred to as continuous integration of the optical signals.

Optionally, the sensor module 115 may perform, under control of the control unit, optical-to-electrical signal conversion only when the filter module 112 outputs the target optical signal; or may perform optical-to-electrical signal conversion on all optical signals output by the filter module 112. In the latter case, the image signal processor 121 may select, from the electrical signals output by the sensor module 115, an electrical signal obtained by converting the target optical signal. The electrical signals output by the sensor module 115 may be referred to as raw image data.

An example of the sensor module 115 is a full-band pass sensor. Photosensitive imaging can be performed for visible light on each pixel of the full-band pass sensor, or photosensitive imaging can be performed for visible light and near infrared light on each pixel of the full-band pass sensor.

The image signal processor (image signal processor, ISP) 121 is configured to process the electrical signals output by the sensor module 115, to obtain a color image. For example, the image signal processor 121 is configured to perform the following processing on the raw image data: white balance (white balance, WB), color restoration (color correction, CC), gamma (gamma) correction, and three-dimensional look-up table (3 dimensions look-up-table, 3D Lut) correction, to implement color-related tuning to obtain a full-color image.

The filter control unit 123 is configured to output a control signal to the filter module 112, to control the filter module 112 to output target optical signals of different bands in incident light through filtering at different times.

The storage module 130 is configured to store program code to be executed by the processing module 120 and/or image-related data, for example, raw image data collected by the sensor module 115, temporary data obtained when the processing module 120 performs color tuning on the raw image data, and a color image obtained through color tuning.

The storage module 130 may be a read-only memory (read-only memory, ROM), a static storage device, a dynamic storage device, a random access memory (random access memory, RAM), or the like.

The display module 140 is configured to display the color image obtained by the image signal processor 121 through processing. The display module 140 may be a liquid crystal display (liquid crystal display, LCD), a light emitting diode (light emitting diode, LED) display device, a cathode ray tube (cathode ray tube, CRT) display device, a projector (projector), or the like.

In the imaging system shown in FIG. 1, demosaicing processing does not need to be performed, so that image resolution can be increased, and a moiré pattern can be avoided. The filter module 112 can provide finer spectral raw data, and the processing module 120 can provide a high-dimensional CCM matrix, to ensure multi-degree of freedom in color tuning and ensure color restoration accuracy.

Figure 2:
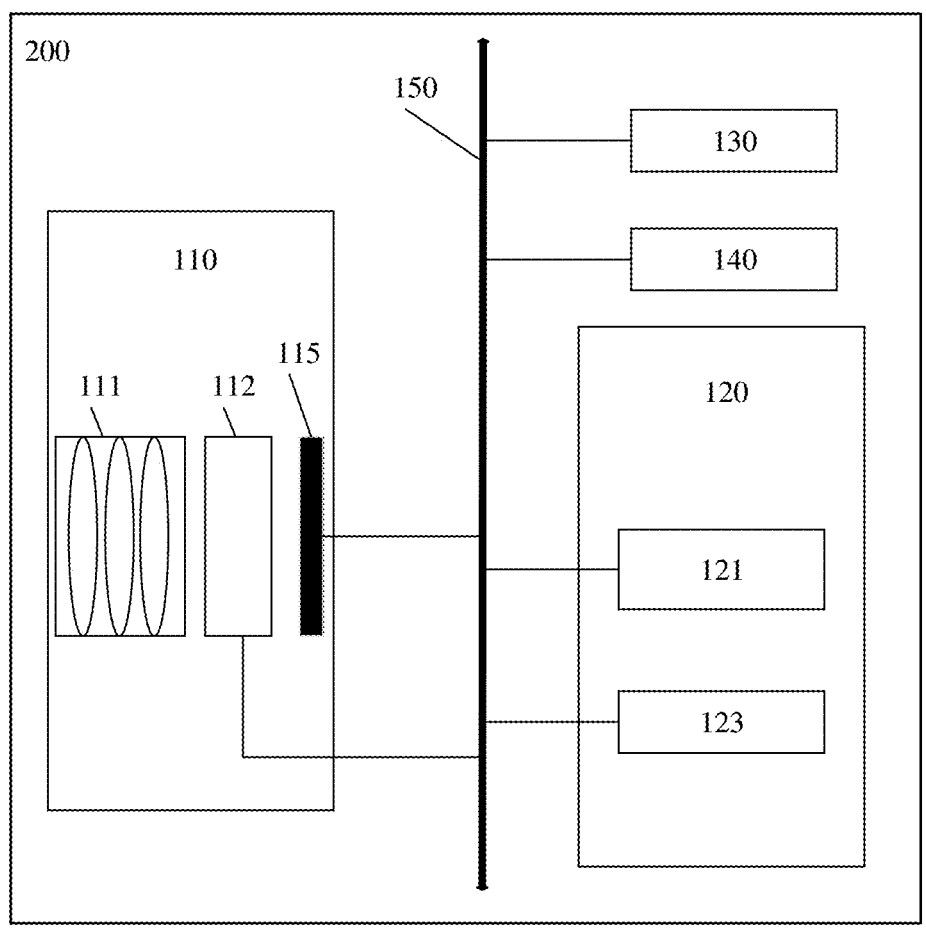
FIG. 2 is a schematic diagram of a structure of an imaging system according to another embodiment of this application.

FIG. 2 is a schematic diagram of an architecture of an imaging system 200 according to another embodiment of this application. As shown in FIG. 2, the imaging system 200 may include the components of the imaging system 100, and in addition, the camera module no in the imaging system 200 may further include a lens module 111.

The lens module 111 may be further configured to enable the target optical signal output by the filter module 112 to cover a larger area of a photosensitive region of the sensor module 115, for example, to just cover the photosensitive region of the sensor module 115. An angle at which an optical signal passing through the lens module 111 is incident on the filter module 112 is less than an angle at which the optical signal is incident on the filter module 112 when there is no lens module 111. In other words, the lens module 111 may be intended to reduce an angle at which the optical signal is incident on the filter module 112. In this way, the lens module 111 reduces a problem of a color deviation generated by the filter module 112 in a case of large-angle incidence, and also ensures that more optical signals are incident on the sensor module 115, so that imaging quality can be further improved.

It may be understood that the lens module 111 is located before the filter module 112, and the lens module 111 may be further configured to: collect optical signals or an optical signal transmitted or reflected by a target object and/or a target scene, and output the optical signals or the optical signal to the filter module 112.

The lens module 111 may include but is not limited to the following lens components: a plastic lens group, a plastic-glass hybrid lens group, a diffractive optical element (diffractive optical elements, DOE) lens, a metalens (metalens), or another lens. It may be understood that the lens module 111 includes three lenses only as an example, and the lens module 111 may include more or less lenses or more types of lenses.

Figure 3:
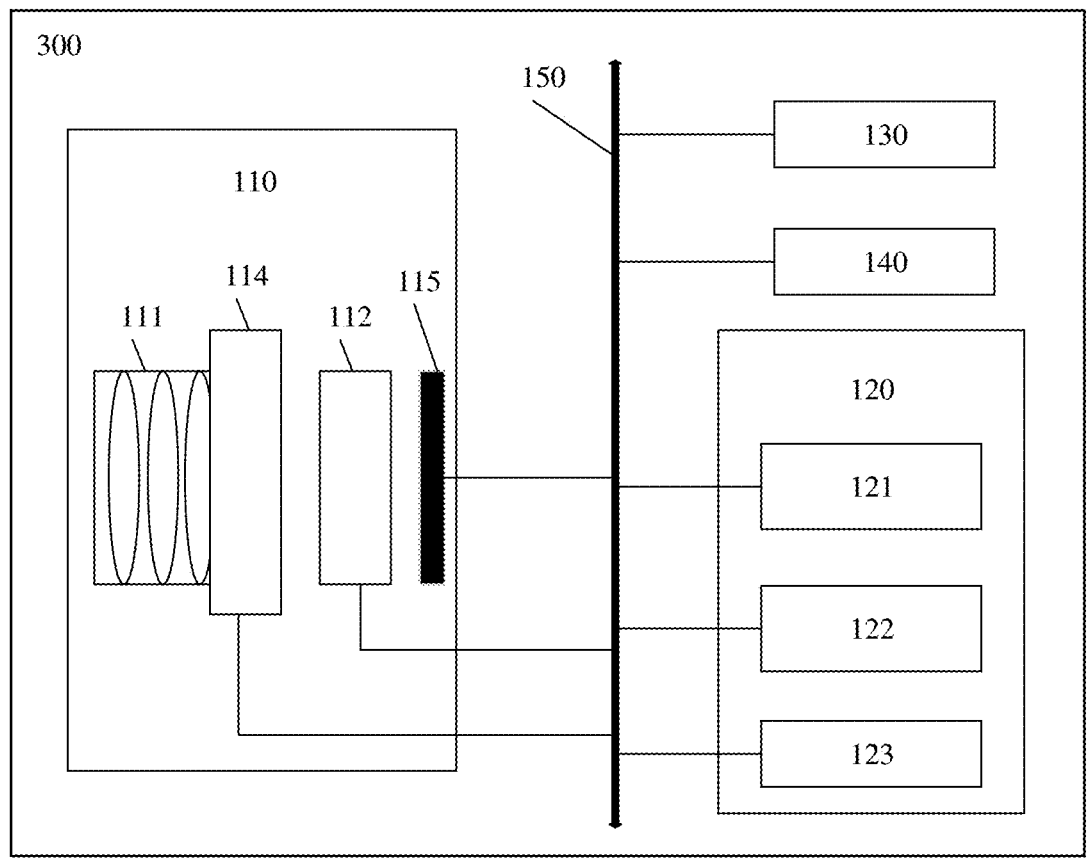
FIG. 3 is a schematic diagram of a structure of an imaging system according to another embodiment of this application.

FIG. 3 is a schematic diagram of an architecture of an imaging system 300 according to another embodiment of this application. As shown in FIG. 3, the imaging system 300 may include the components of the imaging system 200, and in addition, the camera module no in the imaging system 300 may further include a motor module 114, and the processing module 120 may further include a motor control unit 122.

The motor module 114 is specifically configured to: receive a control signal output by the motor control unit 122, and move the lens module 111 based on the control signal, to adjust a relative position between the lens module 111 and the sensor module 115, for example, adjust a distance between the lens module 111 and the sensor module 115 in an optical axis direction of a lens, to implement a focusing function, and adjust the relative position between the lens module in and the sensor module 115 in a direction perpendicular to the optical axis direction, to implement optical image stabilization.

The motor module 114 may include but is not limited to the following types of motors: a voice coil motor (voice coil motor, VCM), a shape-memory alloy (shape-memory alloy, SMA) motor, a piezo (Piezo) motor, or a micro-electromechanical system (microelectro mechanical system, Mems) motor.

In this embodiment of this application, the filter module is independent of focusing and optical image stabilization functions, and therefore optical image stabilization performance is not sacrificed.

Figure 4:
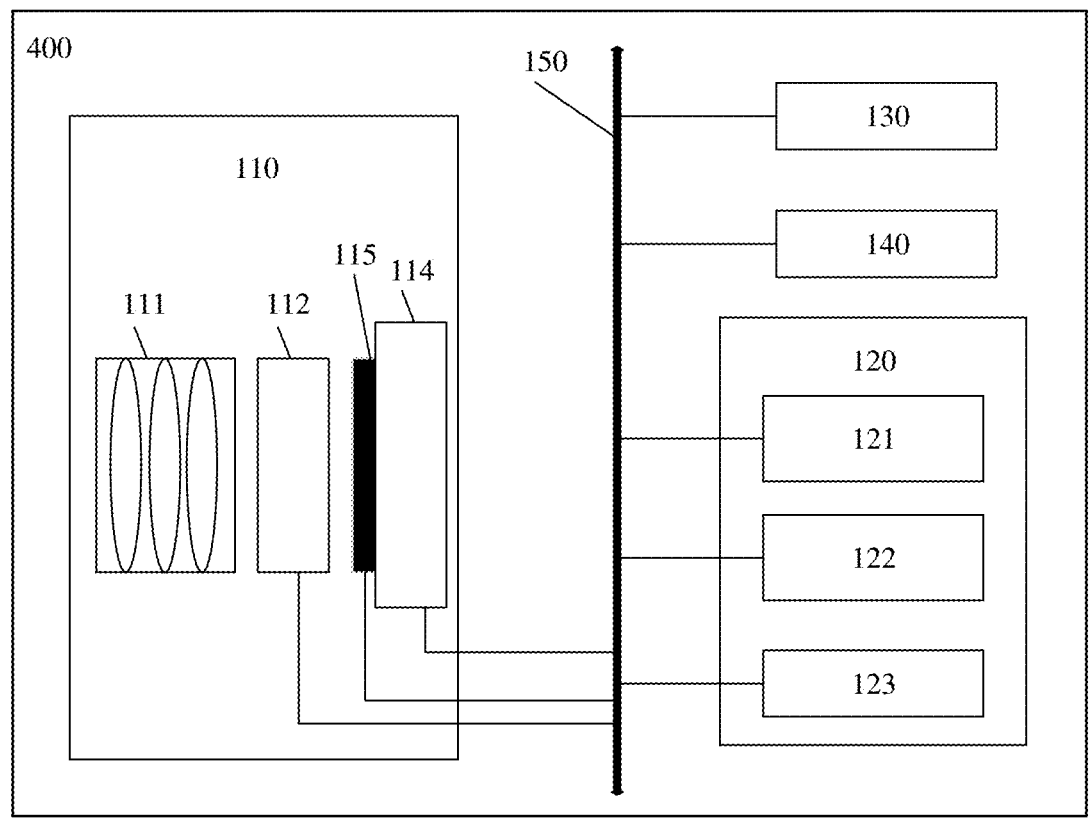
FIG. 4 is a schematic diagram of a structure of an imaging system according to another embodiment of this application.

FIG. 4 is a schematic diagram of an architecture of an imaging system 400 according to another embodiment of this application. As shown in FIG. 4, the imaging system 400 may include the components of the imaging system 300. Differences are as follows: The motor module 114 is specifically configured to: receive a control signal output by the motor control unit 122, and move the sensor module 115 based on the control signal, to adjust a relative position between the lens module 111 and the sensor module 115, for example, adjust a distance between the lens module 111 and the sensor module 115 in an optical axis direction of a lens, to implement a focusing function, and adjust the relative position between the lens module 111 and the sensor module 115 in a direction perpendicular to the optical axis direction of the lens, to implement optical image stabilization.

Figure 5:
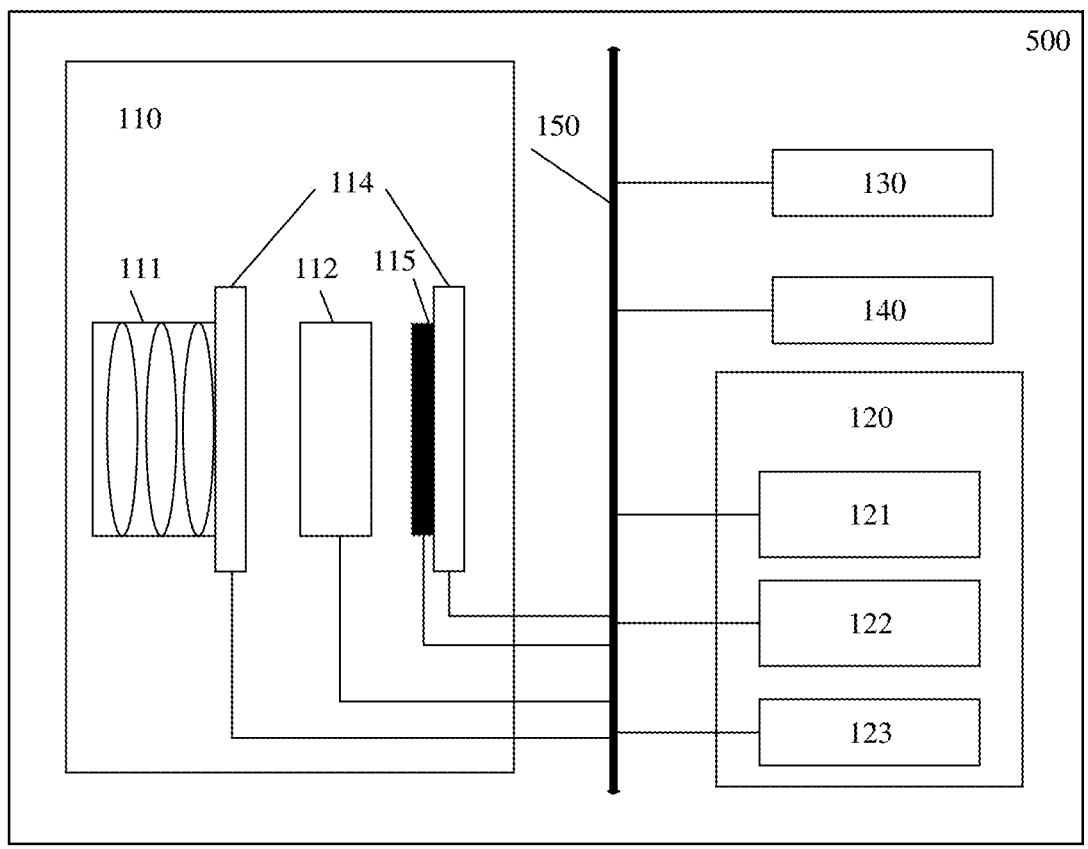
FIG. 5 is a schematic diagram of a structure of an imaging system according to another embodiment of this application.

FIG. 5 is a schematic diagram of an architecture of an imaging system 500 according to another embodiment of this application. As shown in FIG. 5, the imaging system 500 may include the components of the imaging system 300. Differences are as follows: The motor module 114 is specifically configured to: receive a control signal output by the motor control unit 122, and move the lens module 111 and the sensor module 115 based on the control signal, to adjust a relative position between the lens module 111 and the sensor module 115, for example, adjust a distance between the lens module 111 and the sensor module 115 in an optical axis direction of a lens, to implement a focusing function, and adjust the relative position between the lens module 111 and the sensor module 115 in a direction perpendicular to the optical axis direction, to implement optical image stabilization. In addition, the motor module 114 can move both the lens module 111 and the sensor module 115, so that focusing and image stabilization can be quickly implemented.

Figure 6:
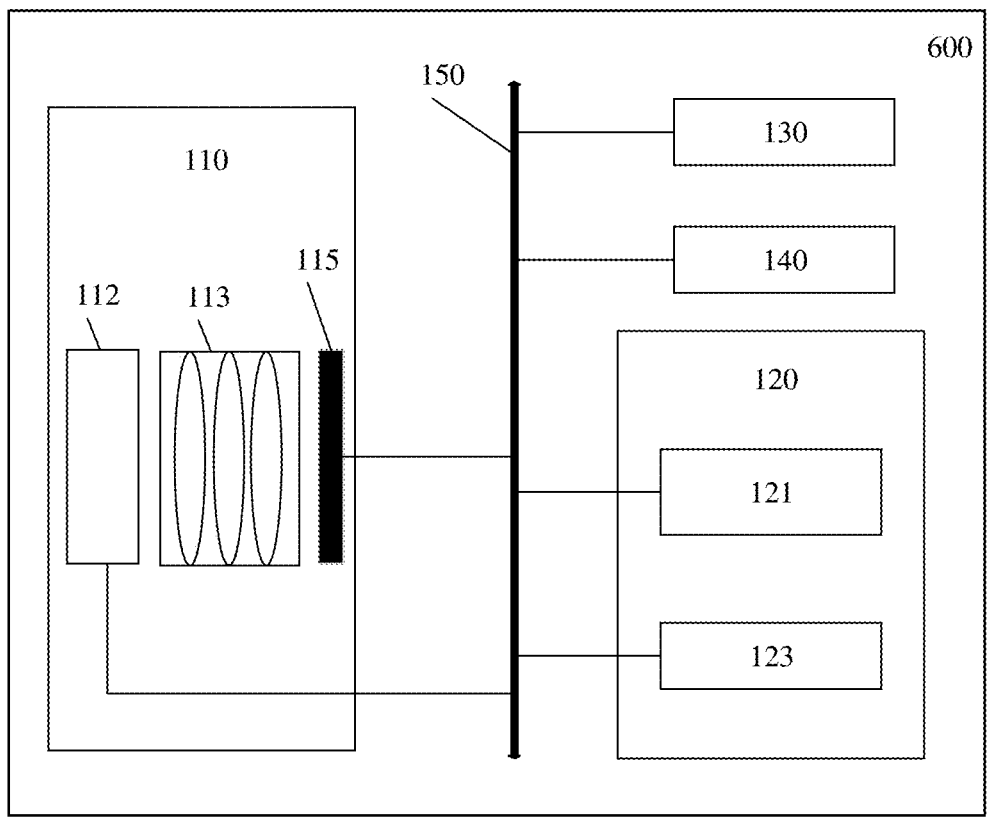
FIG. 6 is a schematic diagram of a structure of an imaging system according to another embodiment of this application.

FIG. 6 is a schematic diagram of an architecture of an imaging system 600 according to another embodiment of this application. As shown in FIG. 6, the imaging system 600 may include the components of the imaging system 200. Differences are as follows: A position of the lens module 111 in the imaging system 600 is different from that of the lens module 111 in the imaging system 200. Specifically, the lens module 111 in the imaging system 600 is located between the filter module 112 and the sensor module 115.

Figure 7:
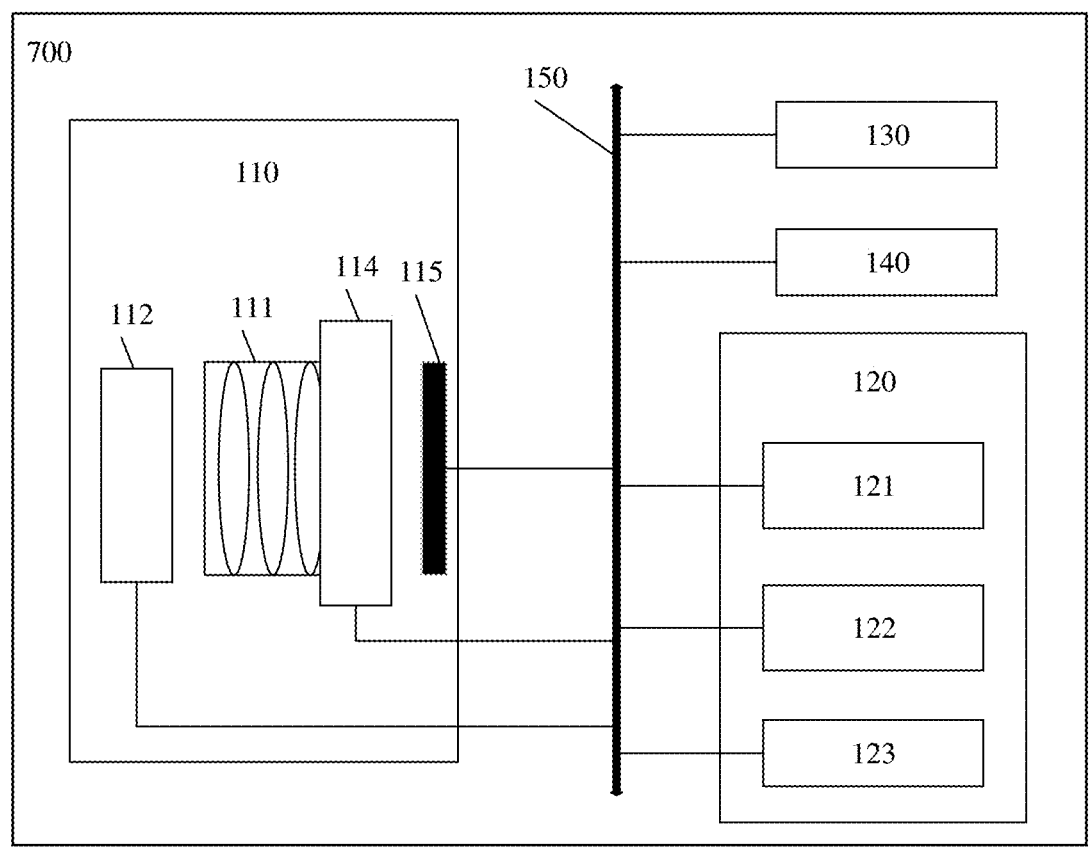
FIG. 7 is a schematic diagram of a structure of an imaging system according to another embodiment of this application.

FIG. 7 is a schematic diagram of an architecture of an imaging system 700 according to another embodiment of this application. As shown in FIG. 7, the imaging system 700 may include the components of the imaging system 300. Differences are as follows: A position of the lens module 111 in the imaging system 700 is different from that of the lens module 111 in the imaging system 300. Specifically, the lens module 111 in the imaging system 700 is located between the filter module 112 and the sensor module 115.

Figure 8:
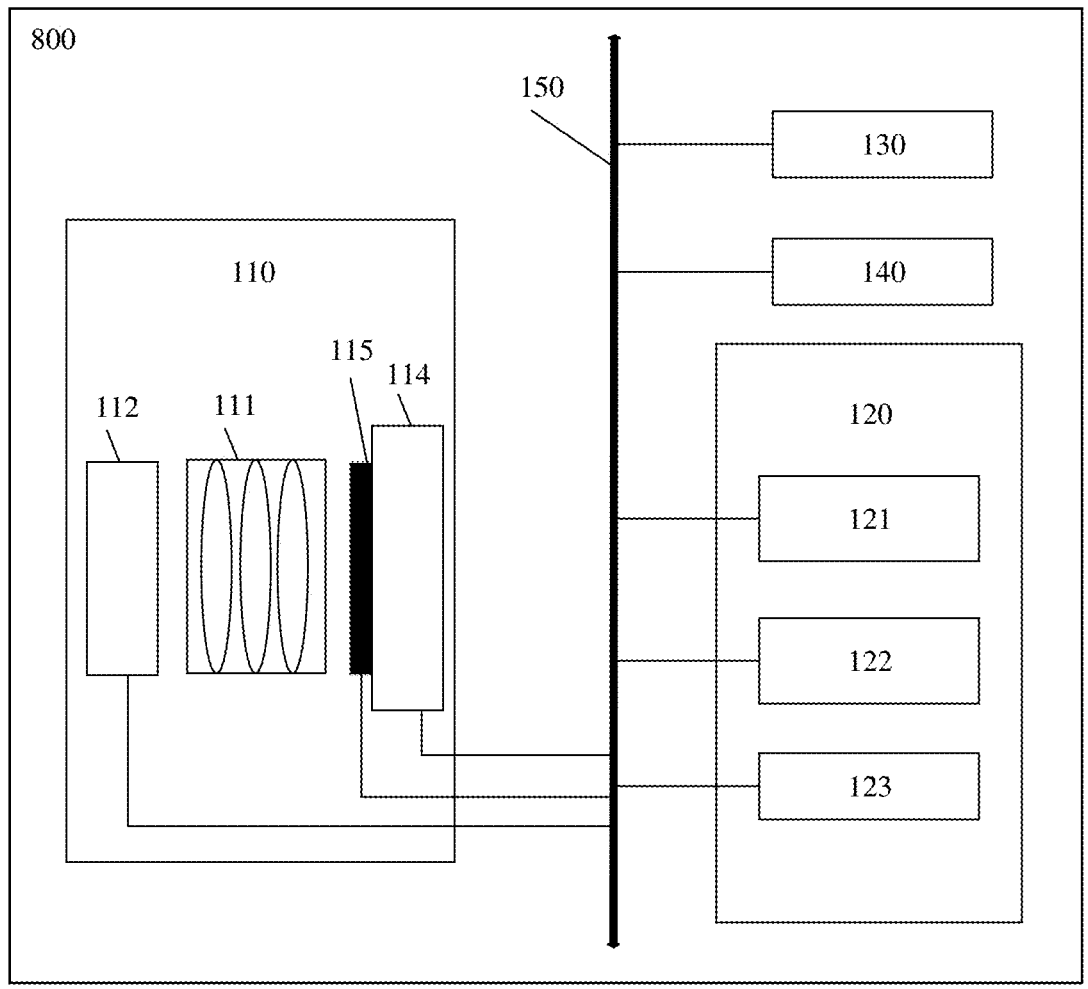
FIG. 8 is a schematic diagram of a structure of an imaging system according to another embodiment of this application.

FIG. 8 is a schematic diagram of an architecture of an imaging system 800 according to another embodiment of this application. As shown in FIG. 8, the imaging system 800 may include the components of the imaging system 400. Differences are as follows: A position of the lens module 111 in the imaging system 800 is different from that of the lens module 111 in the imaging system 400. Specifically, the lens module 111 in the imaging system 800 is located between the filter module 112 and the sensor module 115.

Figure 9:
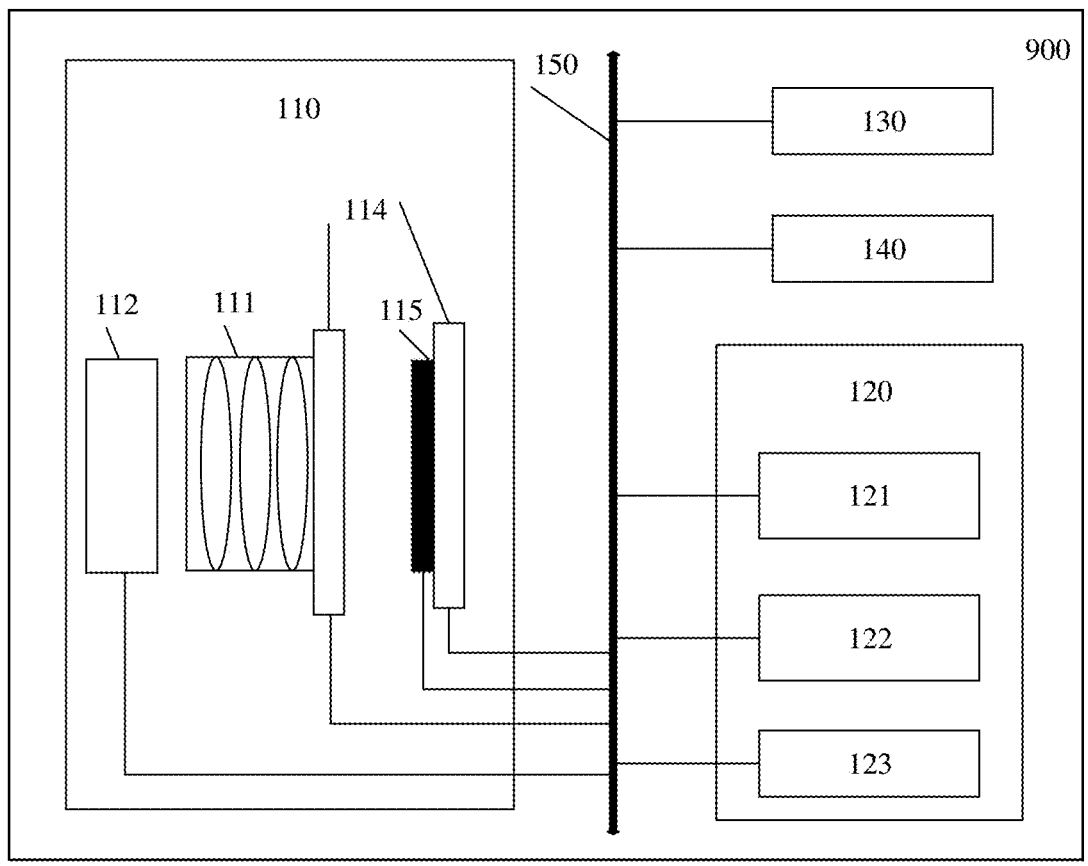
FIG. 9 is a schematic diagram of a structure of an imaging system according to another embodiment of this application.

FIG. 9 is a schematic diagram of an architecture of an imaging system 900 according to another embodiment of this application. As shown in FIG. 9, the imaging system 900 may include the components of the imaging system 500. Differences are as follows: A position of the lens module 111 in the imaging system 900 is different from that of the lens module 111 in the imaging system 500. Specifically, the lens module 111 in the imaging system 900 is located between the filter module 112 and the sensor module 115.

Figure 10:
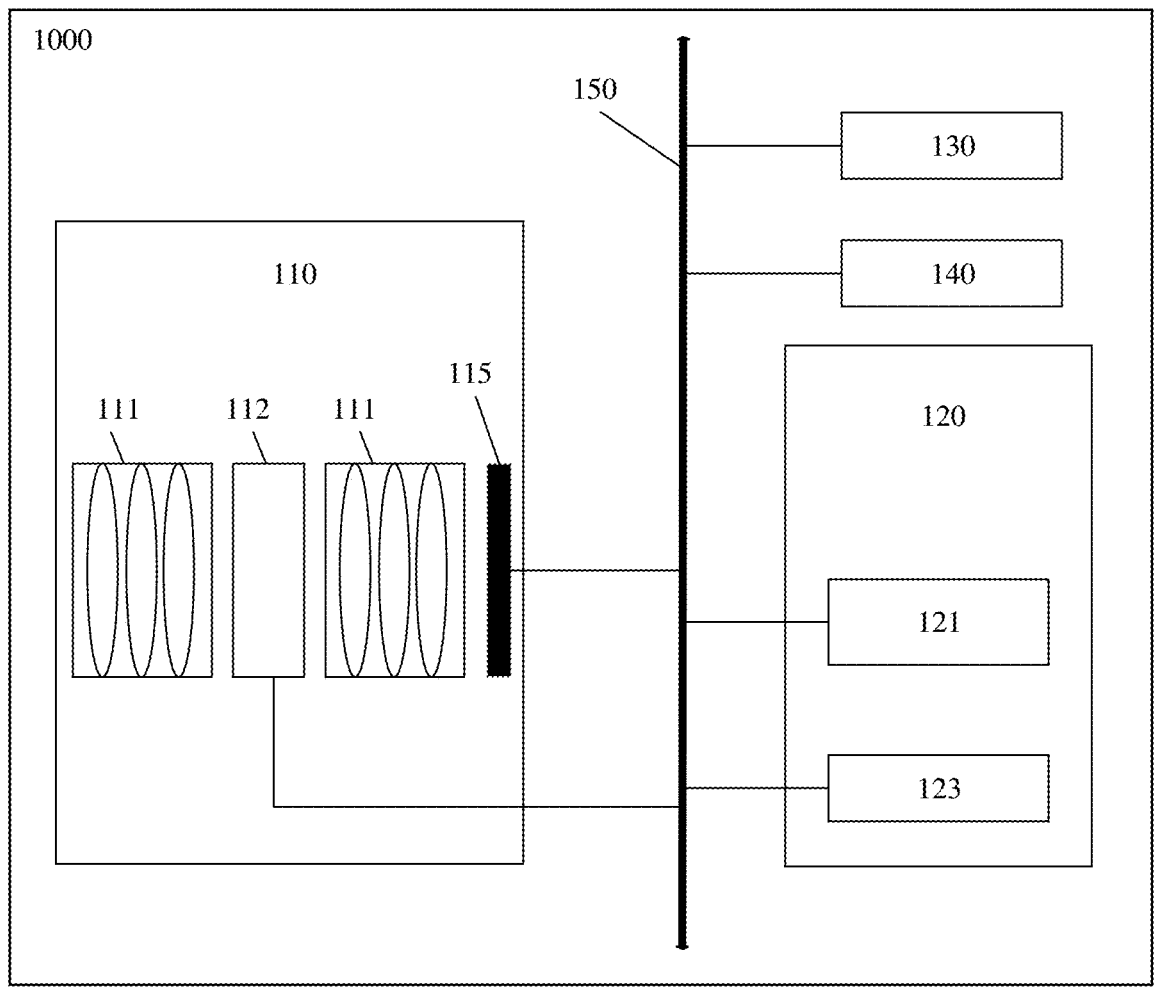
FIG. 10 is a schematic diagram of a structure of an imaging system according to another embodiment of this application.

FIG. 10 is a schematic diagram of an architecture of an imaging system 1000 according to another embodiment of this application. As shown in FIG. 10, the imaging system 1000 may include the components of the imaging system 600. Differences are as follows: The imaging system 1000 includes at least one more lens module 111 than the imaging system 600, and the lens module 111 is located on a side that is of the filter module 112 and that is away from the sensor module 115.

Figure 11:
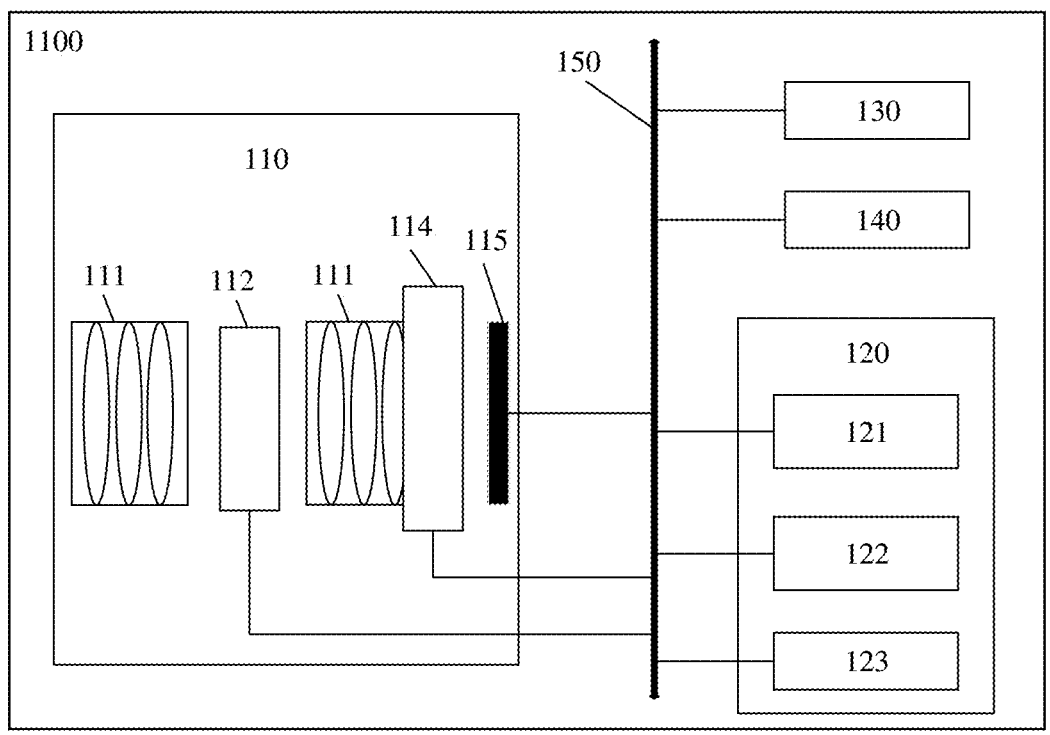
FIG. 11 is a schematic diagram of a structure of an imaging system according to another embodiment of this application.

FIG. 11 is a schematic diagram of an architecture of an imaging system 1100 according to another embodiment of this application. As shown in FIG. 1i, the imaging system 1100 may include the components of the imaging system 700. Differences are as follows: The imaging system 1100 includes at least one more lens module 111 than the imaging system 700, and the lens module 111 is located on a side that is of the filter module 112 and that is away from the sensor module 115.

Figure 12:
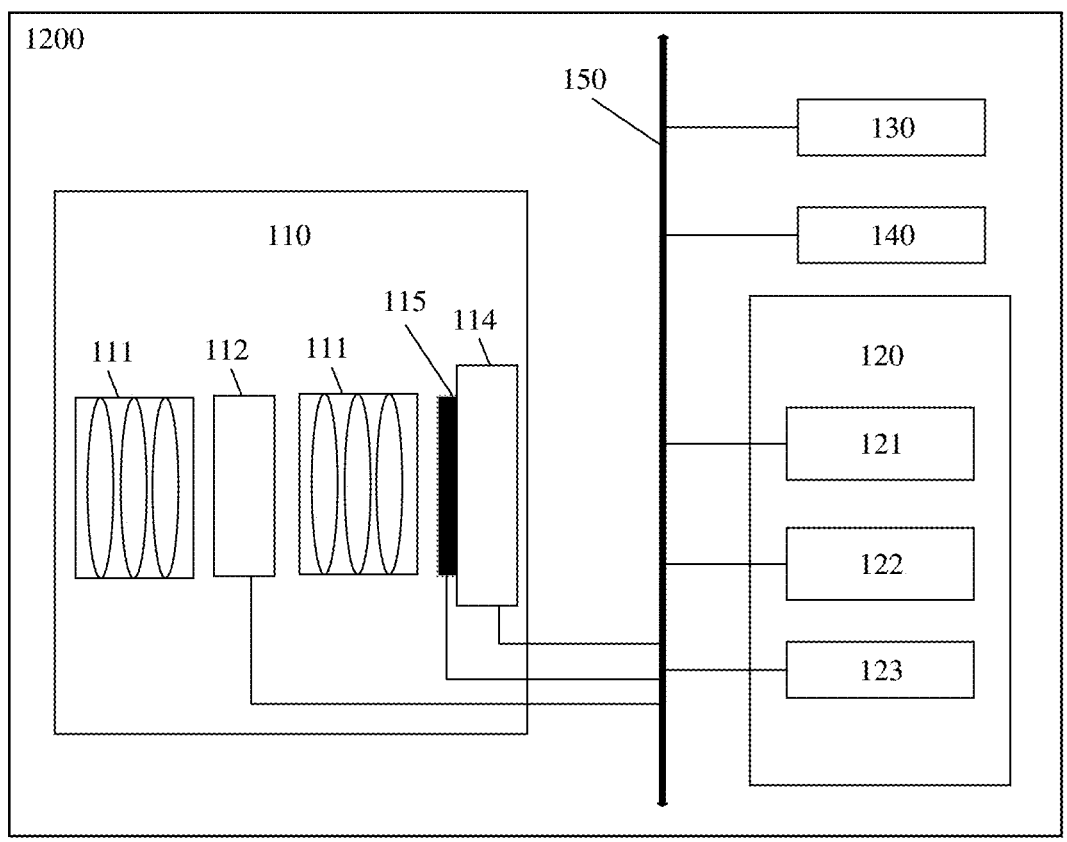
FIG. 12 is a schematic diagram of a structure of an imaging system according to another embodiment of this application.

FIG. 12 is a schematic diagram of an architecture of an imaging system 1200 according to another embodiment of this application. As shown in FIG. 12, the imaging system 1200 may include the components of the imaging system 800. Differences are as follows: The imaging system 1200 includes at least one more lens module 111 than the imaging system 800, and the lens module 111 is located on a side that is of the filter module 112 and that is away from the sensor module 115.

Figure 13:
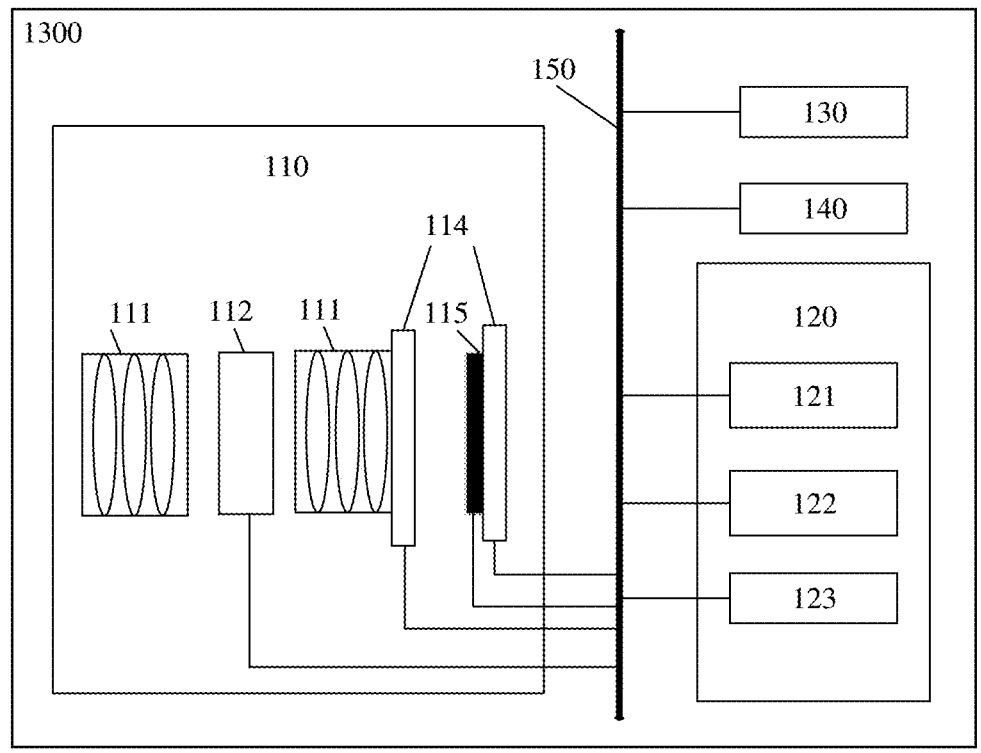
FIG. 13 is a schematic diagram of a structure of an imaging system according to another embodiment of this application.

FIG. 13 is a schematic diagram of an architecture of an imaging system 1300 according to another embodiment of this application. As shown in FIG. 13, the imaging system 1300 may include the components of the imaging system 900. Differences are as follows: The imaging system 1300 includes at least one more lens module 111 than the imaging system 900, and the lens module 111 is located on a side that is of the filter module 112 and that is away from the sensor module 115.

Figure 30:
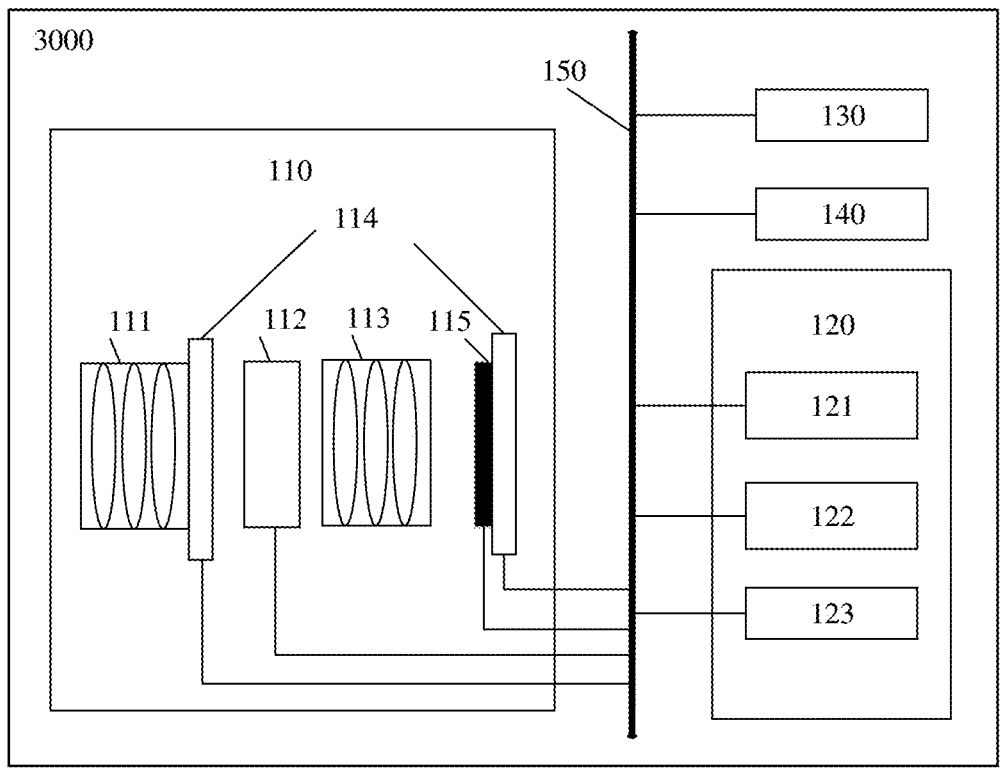
FIG. 30 is a schematic diagram of a structure of an imaging system according to another embodiment of this application.

FIG. 30 is a schematic diagram of an architecture of an imaging system 3000 according to another embodiment of this application. As shown in FIG. 30, the imaging system 3000 may include the components of the imaging system 130o. Differences are as follows: The motor module 114 in the imaging system 3000 is configured to: receive a control signal output by the motor control unit 122, and move, based on the control signal, the sensor module 115 and the lens module 111 on the side that is of the filter module 112 and that is away from the sensor module 115, to adjust a relative position between the lens module 111 and the sensor module 115, so that focusing and image stabilization can be quickly implemented.

The foregoing describes schematic structures of the imaging system provided in this application. The following describes structures of a filter module provided in this application. Before the filter module provided in this application is described, an optical aperture in the imaging system of this application is first described.

Figure 33:
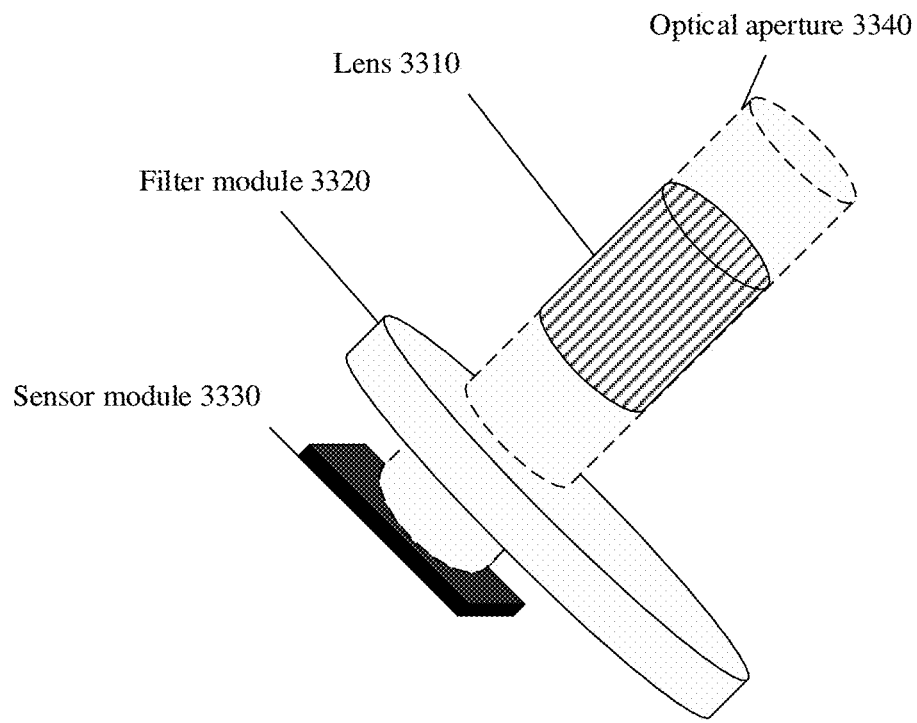
FIG. 33 is a schematic diagram of a structure of a camera module according to an embodiment of this application.

FIG. 33 is a schematic diagram of a structure of a camera module according to an embodiment of this application. As shown in FIG. 33, a camera module 3300 includes a lens 3310, a filter module 3320, and a sensor module 3330. In FIG. 33, a dashed-line cylinder region is centered on a normal line of the lens 3310 and the sensor module 3330, and the dashed-line cylinder region is an optical aperture 3340.

It may be understood that the camera module 3300 includes the lens 3310, the filter module 3320, and the sensor module 3330 only as an example. Actually, a structure of the camera module 3300 may be a structure of a camera module 111 any one of the foregoing imaging systems. For example, the camera module 3300 may further include a motor module, or another lens module may be included between the filter 3320 and the sensor module 3330, or the lens 3310 may not be included.

In addition, it may be understood that a shape of the filter module 3320 shown in FIG. 33 is only an example, and the filter module 3320 may be a filter module shown in any one of FIG. 14 to FIG. 19.

Figure 14:
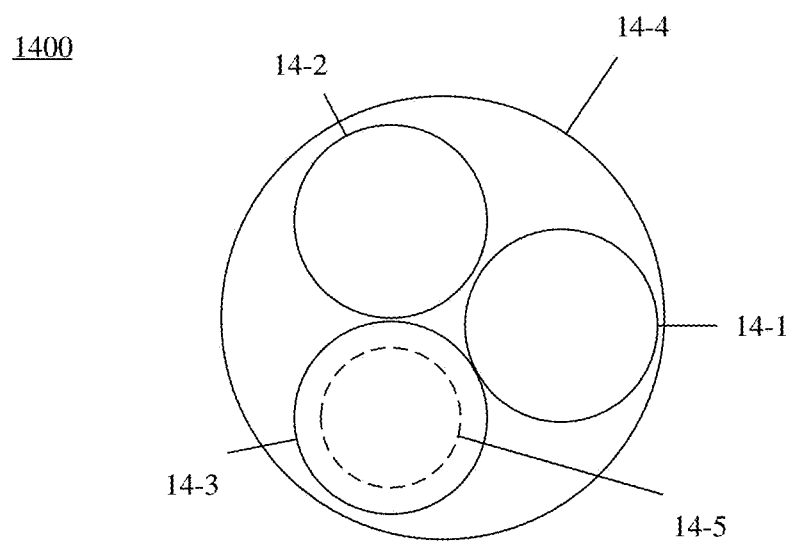
FIG. 14 is a schematic diagram of a structure of a filter module according to an embodiment of this application.

FIG. 14 is a schematic diagram of a structure of a filter module 1400 according to an embodiment of this application. The filter module 1400 may be a filter module 111 a camera module shown in any one of FIG. 1 to FIG. 13.

The filter module 1400 includes a red narrowband filter 14-1, a green narrowband filter 14-2, a blue narrowband filter 14-3, and a high-speed electric wheel 14-4. The red narrowband filter 14-1, the green narrowband filter 14-2, and the blue narrowband filter 14-3 are installed on the high-speed electric wheel 14-4. The high-speed electric wheel 14-4 is not transparent, and only the narrowband filters are transparent.

A working principle of the filter module 1400 is as follows: The high-speed electric wheel receives a control signal output by a filter control unit, and rotates at a high speed under control of the control signal, to drive the red narrowband filter 14-1, the green narrowband filter 14-2, and the blue narrowband filter 14-3 to rotate. Because a position of an optical aperture 14-5 is fixed, the red narrowband filter 14-1, the green narrowband filter 14-2, and the blue narrowband filter 14-3 alternately cover the optical aperture 14-5 when being driven by the high-speed electric wheel. When each of the red narrowband filter 14-1, the green narrowband filter 14-2, and the blue narrowband filter 14-3 covers the optical aperture 14-5, the optical aperture 14-5 outputs a target optical signal of a corresponding band. In other words, the target optical signal output by the filter module 1400 is switched between red, green, and blue bands through high-speed rotation of the high-speed electric wheel.

Figure 16:
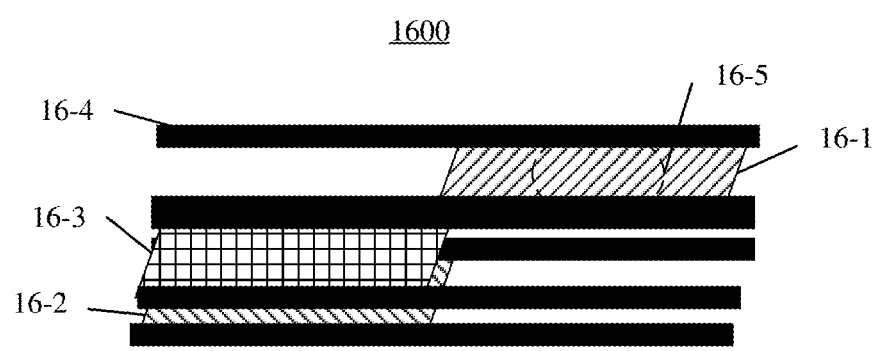
FIG. 16 is a schematic diagram of a structure of a filter module according to another embodiment of this application.

FIG. 16 is a schematic diagram of a structure of a filter module 1600 according to another embodiment of this application. The filter module 1600 includes a red narrowband filter 16-1, a green narrowband filter 16-2, a blue narrowband filter 16-3, and a high-speed electric wheel 16-4. The red narrowband filter 16-1, the green narrowband filter 16-2, and the blue narrowband filter 16-3 are installed on the high-speed electric wheel 16-4. The high-speed electric wheel 16-4 is not transparent. The filter module 1600 is a drawer push-pull mechanical switching structure. For example, in a time period, the red narrowband filter 16-1 is pushed by the high-speed electric wheel 16-4 to a channel on which an optical aperture is located, and the other filters are pulled out of the channel on which the optical aperture is located. The filter module 1600 may be a filter module 111 a camera module shown in any one of FIG. 1 to FIG. 13.

A working principle of the filter module 1600 is as follows: Because a position of the optical aperture 16-5 is fixed, the red narrowband filter 16-1, the green narrowband filter 16-2, and the blue narrowband filter 16-3 alternately cover the optical aperture 16-5 when being driven by a drawer-like/translation motor. When each of the red narrowband filter 16-1, the green narrowband filter 16-2, and the blue narrowband filter 16-3 covers the optical aperture 16-5, the optical aperture 14-5 outputs a target optical signal of a corresponding band. In other words, the target optical signal output by the filter module 1600 is switched between red, green, and blue bands through driving of the drawer-like/translation motor.

It may be understood that the filters in the filter module 1400 or the filter module 1600 may be filters of other bands, for example, may be a red narrowband filter, a yellow narrowband filter, and a blue narrowband filter, may be a red narrowband filter, a blue narrowband filter, and a full-band filter, or may be a red narrowband filter, a green narrowband filter, a blue narrowband filter, and a full-band filter.

Figure 15:
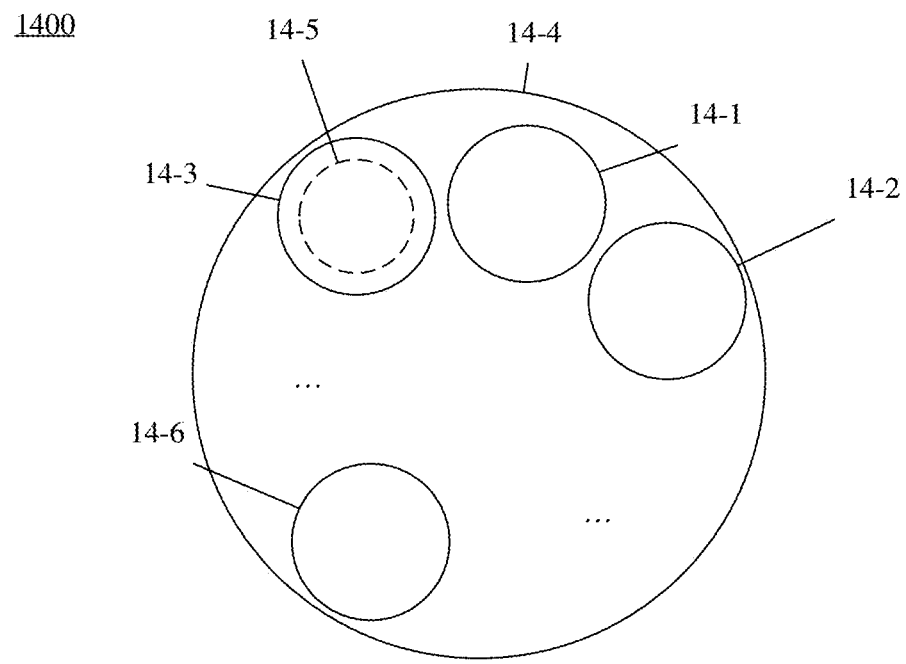
FIG. 15 is a schematic flowchart of a filter module according to another embodiment of this application.
Figure 17:
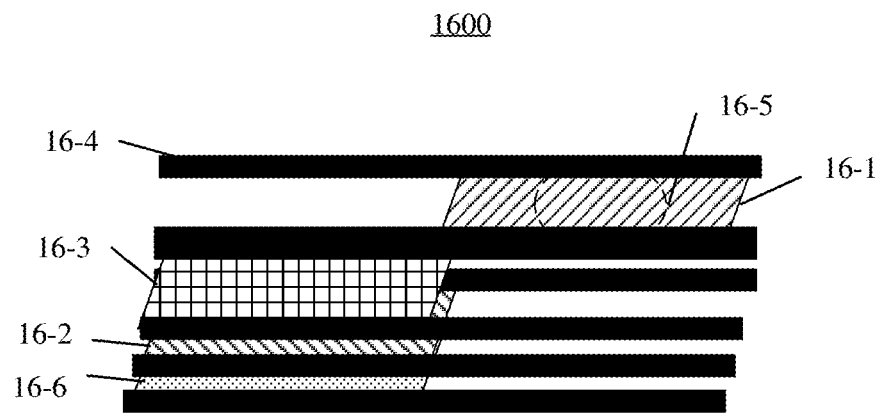
FIG. 17 is a schematic diagram of a structure of a filter module according to another embodiment of this application.

It may be understood that filters may be increased to implement finer spectral modulation to obtain a higher-quality image. For example, as shown in FIG. 15, a filter 14-6 or even more filters may be added to the filter module 1400. For example, when the filter module 1400 is configured to perform imaging for infrared light, an infrared filter may be installed on the high-speed electric wheel 14-4, and the infrared filter allows only infrared light to pass through. For example, as shown in FIG. 17, when the filter module 1600 is configured to perform imaging for infrared light, an infrared filter 16-6 may be installed on the high-speed electric wheel 16-4, and the infrared filter allows only infrared light to pass through.

Based on the filter module shown in FIG. 14 and FIG. 15, an infrared cut-off filter may cover the optical aperture 14-5. Based on the filter module shown in FIG. 16 or FIG. 17, an infrared cut-off filter may cover the optical aperture 16-5. The infrared cut-off filter does not rotate with the high-speed electric motor, to filter out infrared light in a target optical signal, so that imaging quality is improved. Alternatively, an infrared cut-off filter may cover a surface of a filter that cannot completely filter out infrared light, to filter out infrared light.

Figure 18:
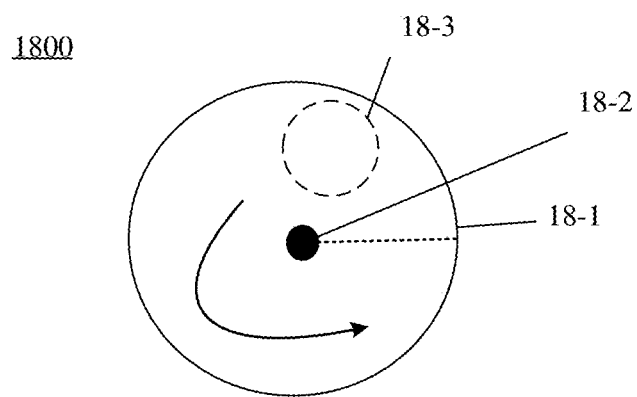
FIG. 18 is a schematic diagram of a structure of a filter module according to another embodiment of this application.

FIG. 18 is a schematic diagram of a structure of a filter module 1800 according to another embodiment of this application. The filter module 1800 may be a filter module 111 a camera module shown in any one of FIG. 1 to FIG. 13.

The filter module 1800 includes a graded interferometric thin film filter 18-1 and a high-speed electric wheel 18-2, and the graded interferometric thin film filter 18-1 is fastened to the high-speed electric wheel 18-2. The graded interferometric thin film filter 18-1 may perform continuous filtering in a visible light range. The high-speed electric wheel 18-2 is not transparent, and only the graded interferometric thin film filter 18-1 is transparent. An optical aperture of the imaging system is indicated by 18-3.

In a direction of an arrow, the graded interferometric thin film filter 18-1 has a gradient color, and the color gradually changes from light to dark. Therefore, the graded interferometric thin film filter 18-1 can continuously filter light in the visible light range. For example, the graded interferometric thin film filter 18-1 can continuously filter light with wavelengths in a range of 380 nanometers to 780 nanometers.

As shown in FIG. 18, wavelengths of light that can be transmitted by the filter 18-1 continuously change in the direction of the arrow by using a dotted line as a start point. In this way, when the graded interferometric thin film filter 18-1 continuously rotates in an opposite direction of the arrow, wavelengths of target optical signals that can be output by the filter module 1800 through filtering continuously change.

The high-speed electric wheel 18-2 may drive the filter 18-1 to rotate only counterclockwise or clockwise, or may drive the filter to alternately rotate counterclockwise and clockwise.

For example, the high-speed electric wheel 18-2 may drive the filter 18-1 to continuously rotate counterclockwise, to implement continuous filtering.

For another example, the high-speed electric wheel 18-2 may drive the filter 18-1 to continuously rotate clockwise, to implement continuous filtering.

For another example, the high-speed electric wheel 18-2 drives the filter 18-1 to rotate clockwise after driving the filter 18-1 to rotate one circle counterclockwise, and then drives the filter to rotate counterclockwise after driving the filter to rotate one circle clockwise, to implement continuous filtering.

A working principle of the filter module 1800 is similar to the working principle of the filter module 1400, and is not described herein again. Differences are as follows: There is always light passing through the graded filter, and a gap between two filters in the structure 1400 does not exist.

Optionally, if the graded interferometric thin film filter 18-1 cannot completely filter out infrared light, a separate infrared cut-off filter may be installed on the optical aperture 18-3, and the infrared cut-off filter does not rotate with the wheel.

Optionally, when the filter module 1800 is configured to perform imaging for infrared light, the graded interferometric thin film filter 18-1 is continuously tunable from visible light to infrared light.

Figure 19:
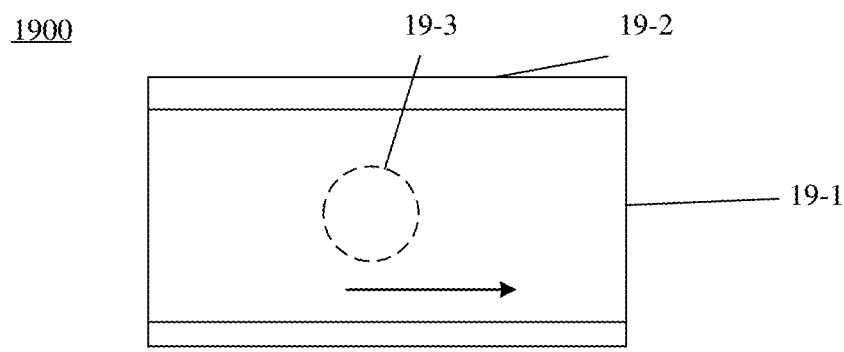
FIG. 19 is a schematic diagram of a structure of a filter module according to another embodiment of this application.

FIG. 19 is a schematic diagram of a structure of a filter module 1900 according to another embodiment of this application. The filter module 1900 may be a filter module 111 a camera module shown in any one of FIG. 1 to FIG. 13.

The filter module 1900 includes a graded interferometric thin film filter 19-1 and a high-speed electric wheel 19-2, and the graded interferometric thin film filter 19-1 is fastened to the motor 19-2. The graded interferometric thin film filter 19-1 performs continuous filtering in a visible light range along a length edge. The motor 19-2 is not transparent, and only the graded interferometric thin film filter 19-1 is transparent. An optical aperture of the imaging system is indicated by 19-3.

In a direction of an arrow, the graded interferometric thin film filter 19-1 has a gradient color, and the color gradually changes from light to dark. Therefore, the graded interferometric thin film filter 19-1 can continuously filter light in the visible light range. For example, the graded interferometric thin film filter 19-1 can continuously filter light with wavelengths in a range of 380 nanometers to 780 nanometers.

As shown in FIG. 19, wavelengths of light that can be transmitted by the filter 19-1 continuously change in the direction of the arrow. In this way, when the graded interferometric thin film filter 19-1 continuously rotates in an opposite direction of the arrow, wavelengths of target optical signals that can be output by the filter module 1900 through continuous filtering continuously change.

In some examples, the motor 19-2 may drive the filter 19-1 to move in the direction of the arrow and to move in the opposite direction of the arrow. For example, the motor 19-2 drives the filter 19-1 to move in the direction of the arrow, so that different color pails of the filter 19-1 slide from the optical aperture 19-3 from left to right. Then the motor 19-2 drives the filter 19-1 to move in the opposite direction of the arrow, so that different color pails of the filter 19-1 slide from the optical aperture 19-3 from right to left.

A working principle of the filter module 1900 is similar to the working principle of the filter module 1400, and is not described herein again. Differences are as follows: The graded filter can continuously filter light, and a gap between two filters in the structure 1400 does not exist.

Optionally, if the graded interferometric thin film filter 19-1 cannot completely filter out infrared light, a separate infrared cut-off filter may be installed on the optical aperture 19-5, and the infrared cut-off filter does not rotate with the wheel.

Optionally, when the filter module 1900 is configured to perform imaging for infrared light, the graded interferometric thin film filter 19-1 is continuously tunable from visible light to infrared light.

Figure 20:
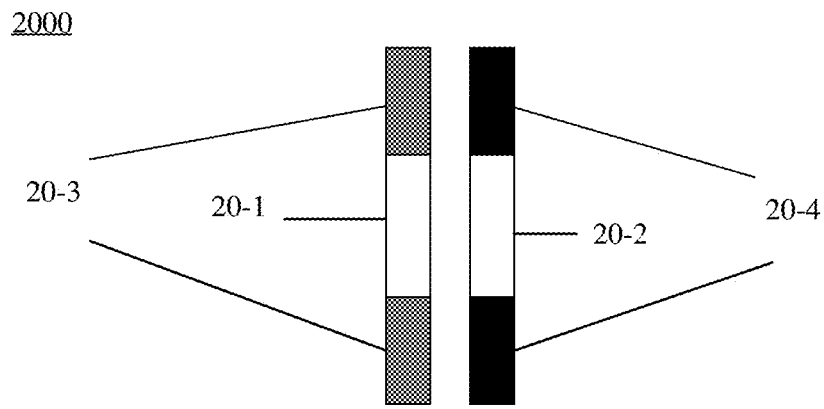
FIG. 20 is a schematic diagram of a structure of a filter module according to another embodiment of this application.

FIG. 20 is a schematic diagram of a structure of a filter module 2000 according to another embodiment of this application. The filter module 2000 may be a filter module 111 a camera module shown in any one of FIG. 1 to FIG. 13.

The filter module 2000 includes a reflector 20-1, a reflector 20-2, a high-speed moving motor 20-3, and a fastening structure 20-4. The reflector 20-1 and the reflector 20-2 are sequentially arranged in an optical axis direction. An optical axis may be understood as a center line of a light pillar (a beam) that vertically passes through the reflector 20-1 and the reflector 20-2. The reflector 20-2 is fastened to a fixed position in the filter module 2000 by using the fastening structure 20-4. When being driven by the high-speed moving motor 20-3, the reflector 20-1 moves away from or toward the reflector 20-1 in the optical axis direction.

The reflector 20-1 may reflect light incident on the reflector 20-1 to the reflector 20-2, and the reflector 20-2 may also reflect light incident on the reflector 20-2 to the reflector 20-1. For example, opposite inner surfaces of the reflector 20-1 and the reflector 20-2 have high reflectivities.

Based on a principle of Fabry-Pérot (Fabry-Pérot, F-P) interference, when two reflection surfaces of the reflector 20-1 and the reflector 20-2 are strictly parallel, and monochrome light coming from any point of a light source is radiated to the reflector 20-1 and the reflector 20-2 at an incident angle θ, transmitted light is obtained through superposition of many parallel beams, and an optical path difference between any pair of adjacent beams is $2 \times n \times l \times \cos \theta$, and transmittance of the reflector 20-1 and the reflector 20-2 is determined by the optical path difference, where n refers to a refractive index of a medium between the reflector 20-1 and the reflector 20-2, l refers to a distance between the reflector 20-1 and the reflector 20-2, and θ refers to the incident angle.

When the optical path difference is an integer multiple of a wavelength of a target optical signal, the reflector 20-1 and the reflector 20-2 have maximum transmittance for the target optical signal. In this case, it may be considered that the filter module 2000 can allow only the target optical signal to pass through and reflect light of another wavelength.

Therefore, the reflector 20-1 may be moved by using the high-speed moving motor 20-3, to change the distance between the reflector 20-1 and the reflector 20-2, so that an optical path difference of transmitted light between the reflector 20-1 and the reflector 20-2 can be adjusted, and therefore, transmittance of light that can pass through the reflector 20-1 and the reflector 20-2 can be adjusted, and the filter module 2000 finally outputs a target optical signal of a required wavelength.

In other examples, the reflector 20-2 may also be disposed on the high-speed moving motor and move with the high-speed moving motor. In these examples, it only needs to be ensured that the distance between the reflector 20-1 and the reflector 20-2 can change when the reflector 20-1 and the reflector 20-2 move with the high-speed moving motor, so that the optical path difference can be an integer multiple of the wavelength of the target optical signal.

The filter module 2000 may be continuously tunable in an entire visible light range, or may be continuously tunable in a visible light range and a near infrared light range. When the filter module 2000 is continuously tunable in the entire visible light range, the reflectors 20-1 and 20-2 may usually be silver (Ag)-plated reflectors.

The high-speed moving motor 20-3 may be an MEMS or a piezo high-speed moving motor. The high-speed moving motor 20-3 may receive a control signal output by a filter control unit. The control signal is used to control a moving distance of the high-speed moving motor 20-3.

Figure 21:
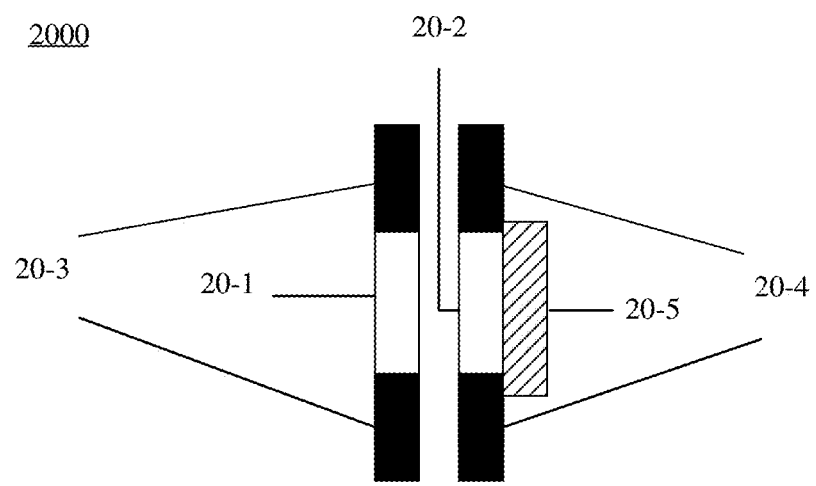
FIG. 21 is a schematic diagram of a structure of a filter module according to another embodiment of this application.

Optionally, if infrared light is not considered for image processing, an infrared cut-off filter 20-5 may be added to filter the infrared light, as shown in FIG. 21. The infrared cut-off filter 20-5 completely covers an optical aperture of the reflector 20-2, so that only light of a visible light band can be allowed to pass.

Figure 22:
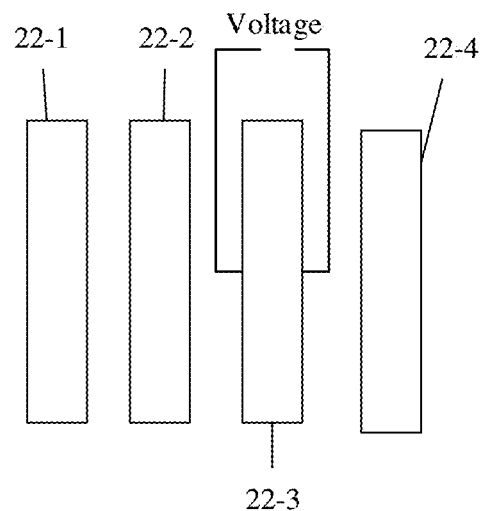
FIG. 22 is a schematic diagram of a structure of a filter module according to another embodiment of this application.

FIG. 22 is a schematic diagram of a structure of a filter module 2200 according to another embodiment of this application. The filter module 2200 may be a filter module 111 a camera module shown in any one of FIG. 1 to FIG. 13.

The filter module 2200 includes a linear polarizer 22-1, a phase delay unit 22-2, a liquid crystal cell 22-3, and an analyzer 22-4. The linear polarizer 22-1, the phase delay unit 22-2, the liquid crystal cell 22-3, and the analyzer 22-4 are sequentially arranged in an optical axis direction. An optical axis may be understood as a center line of a light pillar (a beam) that vertically passes through the linear polarizer 22-1.

An optical signal is converted into linearly polarized light by using the linear polarizer 22-1, and under an action of the phase delayer 22-2 and the liquid crystal cell 22-3, a birefringence effect occurs on the linearly polarized light, and a phase difference is generated, so that the linearly polarized light rotates in a polarization direction, and therefore only an optical signal that has a direction consistent with that of the analyzer 22-4 can pass. Phase differences caused by a same liquid crystal rotation direction to optical signals of different bands are different. Therefore, a variable voltage may be output to the liquid crystal cell, and the variable voltage is used to control the liquid crystal cell to select a target optical signal of a corresponding band. The liquid crystal cell 22-3 may receive a control signal output by a filter control unit. The control signal is used to control an input voltage of the liquid crystal cell 22-3.

Figure 23:
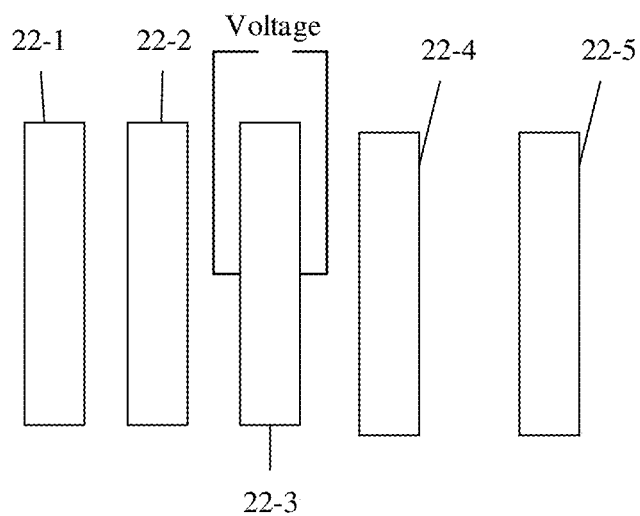
FIG. 23 is a schematic diagram of a structure of a filter module according to another embodiment of this application.

Optionally, an infrared cut-off filter may be added to the filter module 2200 to filter out infrared light, so that imaging quality is improved. In the tunable filter module 2200, there is no special requirement on a position of the infrared cut-off filter, provided that the infrared cut-off filter can cover an entire optical aperture region. In an example, as shown in FIG. 23, an infrared cut-off filter 22-5 is arranged behind the analyzer in the optical axis direction.

Figure 24:
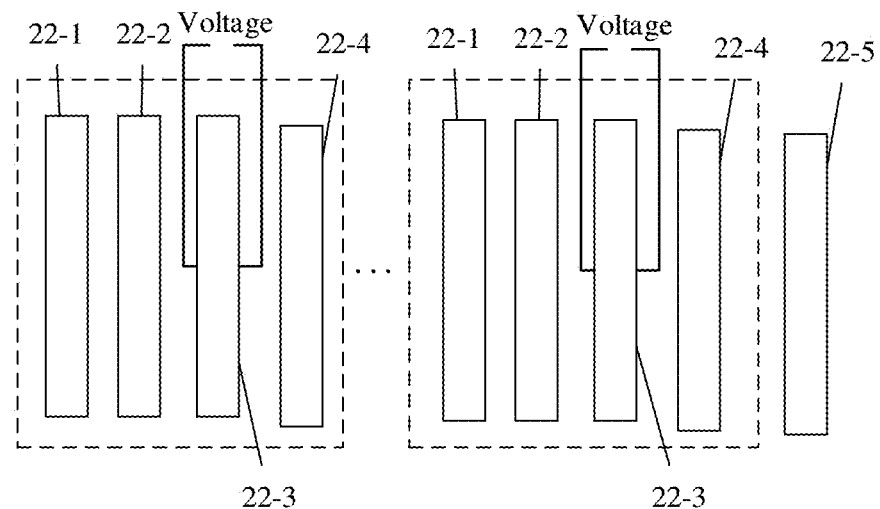
FIG. 24 is a schematic diagram of a structure of a filter module according to another embodiment of this application.

Optionally, as shown in FIG. 24, the structure shown in FIG. 22 (a structure in a dashed-line box in FIG. 24) is used as an integral unit, and a plurality of such structures are sequentially arranged in the optical axis direction to obtain a new filter module 2400. The filter structure can output an optical signal of a finer band. Optionally, an infrared cut-off filter may be added to the filter module 2400 to filter out infrared light, so that imaging quality is improved.

In the tunable filter module 2400, there is no special requirement on a position of the infrared cut-off filter, provided that the infrared cut-off filter can cover an entire optical aperture region. In an example, an infrared cut-off filter 24-5 is arranged behind the last analyzer in the optical axis direction.

Figure 25:
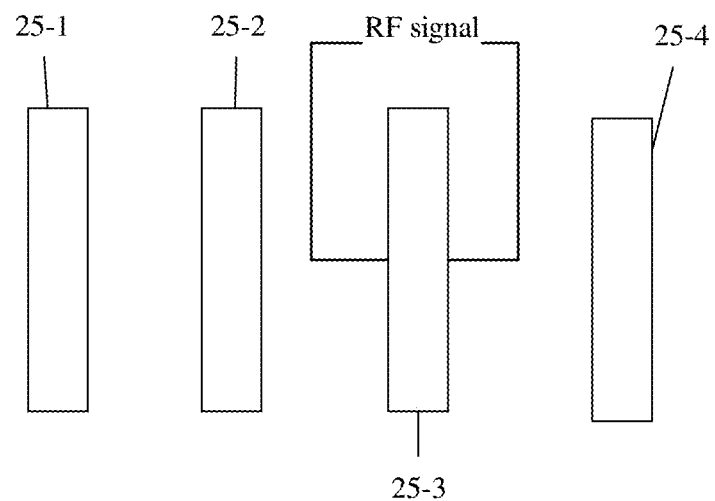
FIG. 25 is a schematic diagram of a structure of a filter module according to another embodiment of this application.

FIG. 25 is a schematic diagram of a structure of a filter module 2500 according to another embodiment of this application. The filter module 2500 may be a filter module 111 a camera module shown in any one of FIG. 1 to FIG. 13.

The filter module 2500 includes a linear polarizer 25-1, a phase delay unit 25-2, an acousto-optic tunable filter (AOTF) 25-3, and an analyzer 25-4. The linear polarizer 25-1, the phase delay unit 25-2, the acousto-optic tunable filter (AOTF) 25-3, and the analyzer 25-4 are sequentially arranged in an optical axis direction. An optical axis may be understood as a center line of a light pillar (a beam) that vertically passes through the linear polarizer 25-1. The phase delay unit is also referred to as a phase delayer.

An incident optical signal is converted into linearly polarized light by using the linear polarizer 25-1, and under an action of the phase delayer 25-2 and the AOTF 25-3, a birefringence effect occurs on the linearly polarized light, and a phase difference is generated, so that the linearly polarized light rotates in a polarization direction, and therefore only an optical signal that has a direction consistent with that of the analyzer 25-4 can pass. The AOTF is driven by using a radio frequency. Phase differences caused by a same radio frequency (radio frequency, RF) signal to different wavelengths are different. Therefore, a frequency of a radio frequency signal may be changed to control the AOTF to select light of different wavelengths.

The phase delayer may be a liquid crystal phase delayer, and a material of the AOTF may be tellurium dioxide ($TeO_2$).

Figure 26:
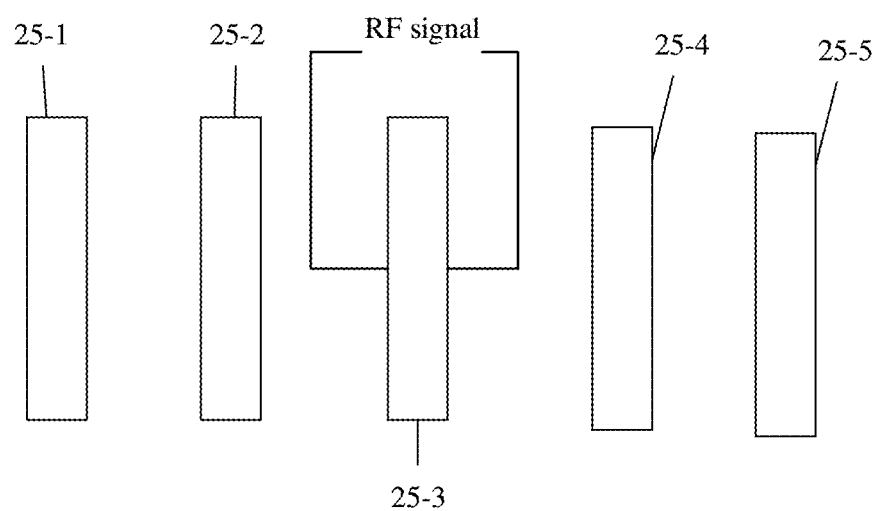
FIG. 26 is a schematic diagram of a structure of a filter module according to another embodiment of this application.

Optionally, to improve imaging quality, an infrared cut-off filter may be added to the filter module. In the tunable filter module 2600, there is no special requirement on a position of the infrared cut-off filter, provided that the infrared cut-off filter can cover an entire optical aperture region. In an example, as shown in FIG. 26, an infrared cut-off filter 25-5 is arranged behind the analyzer in the optical axis direction.

In embodiments of this application, because the filter module can output target signal light of different bands through time division, the sensor module can obtain complete monochrome images without performing an interpolation operation, so that a problem that image quality is degraded due to an interpolation operation can be avoided.

Figure 27:
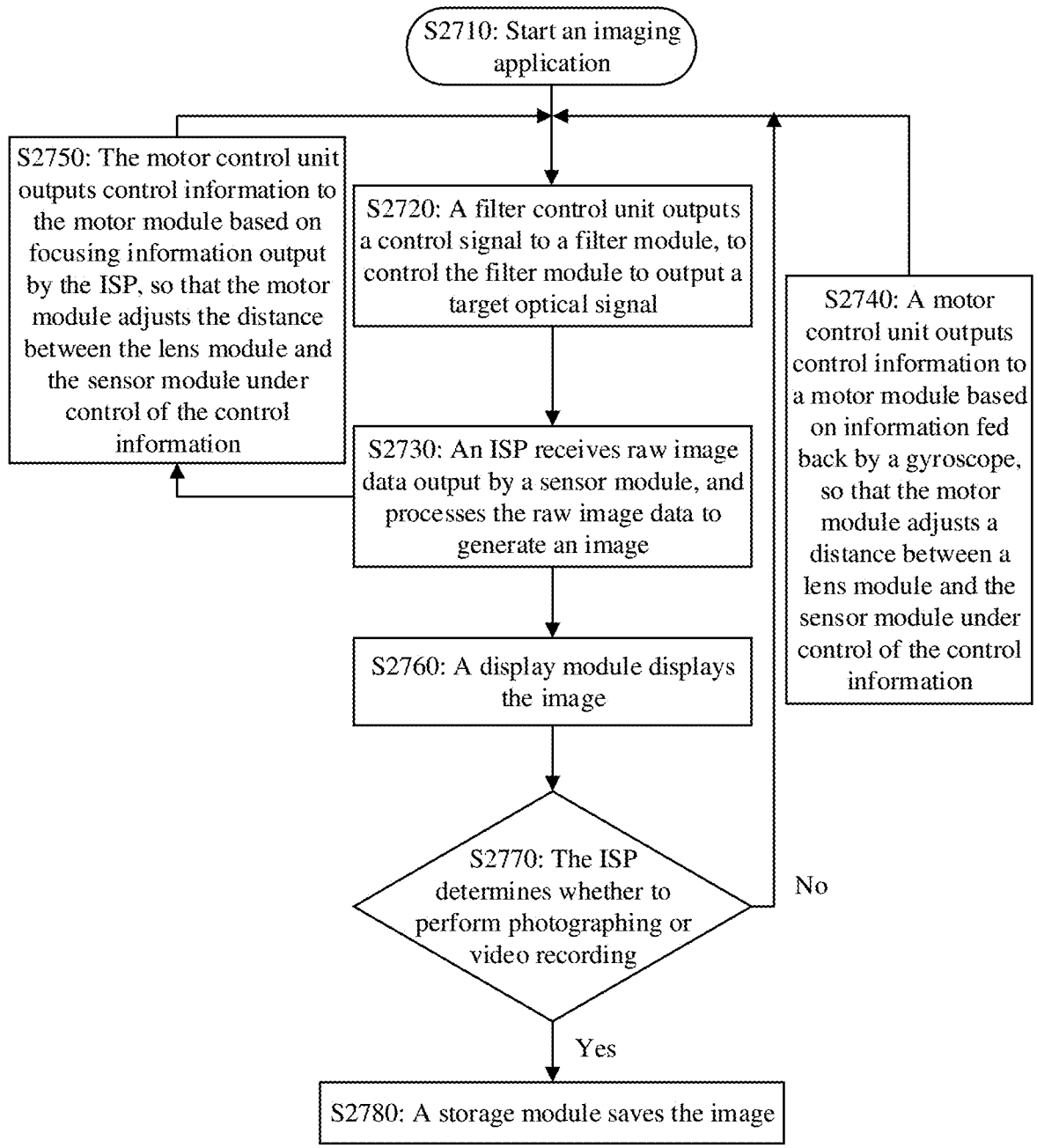
FIG. 27 is a schematic flowchart of an imaging method according to an embodiment of this application.

FIG. 27 is a schematic flowchart of an imaging method according to an embodiment of this application. The imaging method may be performed by an imaging system shown in any one of FIG. 1 to FIG. 13.

The imaging method shown in FIG. 27 includes S2710 to S2780. It may be understood that the imaging method provided in this application may include more or less steps. For example, when an imaging system that performs the imaging method does not include a motor module or a motor control unit, the imaging method does not include S2750 or S2740.

S2710: Start an imaging application. For example, a user taps an icon of an imaging application on a mobile phone, and the mobile phone starts the imaging application.

S2720: A filter control unit outputs a control signal to a filter module, to control the filter module to output a target optical signal.

Specifically, the filter control unit controls, based on a specified spectral mode, the filter module to perform spectral screening. The spectral mode includes but is not limited to the following modes: an RGB mode, where required bands include red, green, and blue bands; an RYB mode, where required bands include red, yellow, and blue bands; an RWB mode, where required bands include red and blue bands and a full band; an RGBW mode, where required bands include red, green, and blue bands and a full band; and some other special spectral modes, where in addition to a visible light band, required bands may include a near infrared light band, for example, used for subsequent image processing, to obtain better imaging quality in an ISP through calculation. A spectral range of each band may be fine-tuned based on actual application.

A sensor module receives an optical signal, converts the optical signal into an electrical signal (namely, raw image data), and transmits the electrical signal to the ISP. In some designs, a photosensitive integration time and a period of the sensor module fit filter times and periods of various filters in the filter module. Specifically, the sensor module continuously integrates target optical signals of a specified single band, and does not detect an optical signal in a band switching process in each spectral mode. Data obtained by the sensor module by performing continuous integration on the target optical signals of the specified single band may be referred to as narrowband images.

S2730: The ISP receives the raw image data from the sensor module, and processes the raw image data. For example, the sensor module transmits a narrowband image group to the ISP, and the ISP performs processing such as preprocessing, white balance, color restoration, gamma correction, and 3D LUT correction on narrowband images in an entire color image processing pipeline (color image processing pipeline), to finally complete color-related tuning to obtain a color image.

S2740: The motor control unit outputs control information to the motor module based on information fed back by a gyroscope, so that the motor module adjusts a distance between a lens module and the sensor module under control of the control information. If the imaging system does not include the motor module or the motor control unit, this step may not be performed.

S2750: The motor control unit outputs control information to the motor module based on focusing information output by the ISP, so that the motor module adjusts the distance between the lens module and the sensor module under control of the control information. If the imaging system does not include the motor module or the motor control unit, this step may not be performed.

S2760: A display module displays the color image obtained by the ISP through processing.

S2770: Determine whether to perform photographing or video recording. For example, when the user taps a "photo" or "video" button in a user interface, it is determined to perform photographing or video recording.

S2780: If it is determined to perform photographing or video recording, a storage module saves the color image obtained by the ISP through processing; otherwise, perform S2720 again.

In this embodiment of this application, because the narrowband images received by the ISP from the sensor module are monochrome images, complete monochrome images can be obtained in the entire ISP color pipeline without a need to perform an interpolation operation (namely, demosaicing processing), so that image resolution can be effectively increased, and a moiré pattern can be avoided, thereby finally improving imaging quality.

Figure 31:
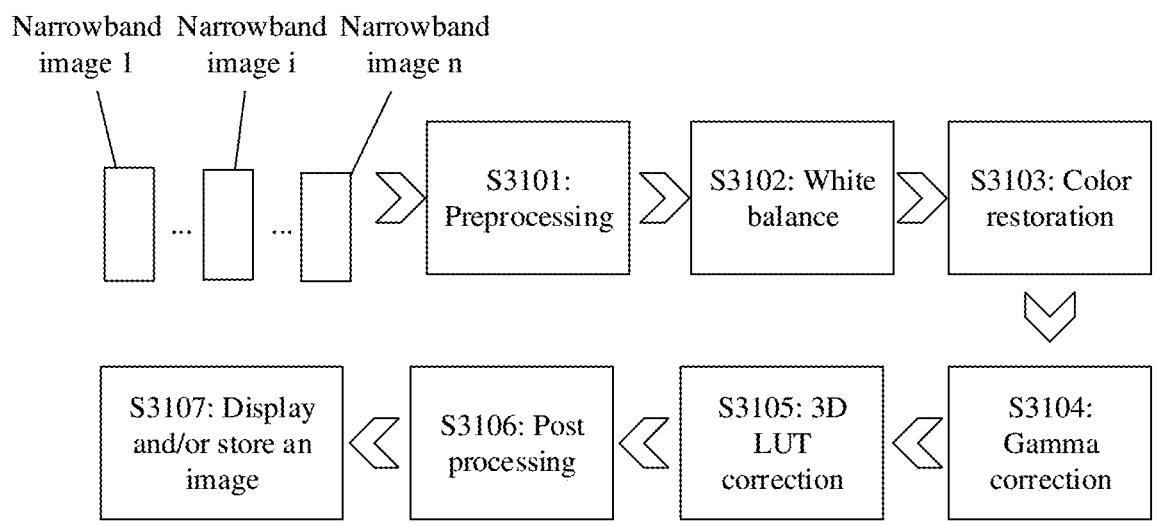
FIG. 31 is a schematic flowchart of an imaging method according to an embodiment of this application.

This application further provides an imaging method. A schematic flowchart of the imaging method is shown in FIG. 31. The imaging method shown in FIG. 31 may include S3101 to S3107.

The imaging method may be performed by an ISP. For example, the ISP processes narrowband images in a color image processing pipeline to obtain a color image. The n narrowband images may be images photographed by using a camera module that includes a filter module shown in any one of FIG. 14 to FIG. 26. A narrowband image 1 to a narrowband image n are in a one-to-one correspondence with n bands included in a spectral mode of an imaging system to which the ISP belongs. A narrowband image i refers to image data obtained by a sensor module by continuously integrating target optical signals of an $i^{th}$ band in the n bands after the filter module obtains the target optical signals of the $i^{th}$ band. For example, when n is equal to 3, the narrowband image 1 corresponds to a red band, and the narrowband image 2 corresponds to a green band, and the narrowband image 3 corresponds to a blue band.

S3101: Preprocess (preprocessing) the n narrowband images.

Preprocessing herein may be performing processing unrelated to a color, for example, related processing such as noise suppression or sharpening, on image data collected by the sensor module.

For example, to implement three channels (n=3), because some tunable filters actually collect more finer channels (n>3) during collection, the filters may add image information corresponding to adjacent channels in a preprocessing phase, to obtain a final channel mode.

Adding the image information corresponding to the adjacent channels can cancel random noise, to improve an anti-noise capability of an obtained image. In other words, the preprocessing manner can improve a photosensitive capability of a multi-channel filter.

S3102: Perform white balance on images obtained through preprocessing.

White balance can restore a color of a photographed scene, so that colors of scenes photographed under different light sources are similar to colors of images viewed by human eyes.

If image data of three channels is obtained through preprocessing, three data matrices are usually required when white balance processing is performed. The three data matrices are in a one-to-one correspondence with the image data of the three channels. For a manner of obtaining the three data matrices, refer to the conventional technology.

If image data of at least three channels is obtained through preprocessing, at least three data matrices are usually required when white balance processing is performed. The at least three data matrices are in a one-to-one correspondence with the image data of the at least three channels. For a manner of obtaining the at least three data matrices, refer to the manner of obtaining three data matrices. Details are not described herein.

S3103: Perform, by using a color correction matrix, color restoration on images obtained through white balance.

Color correction can ensure that a color of an image can relatively accurately reproduce a scene viewed by human eyes at a photographing scene. A dimension of the color correction matrix (color correction matrix, CCM) used for color restoration may be obtained based on a quantity of image channels obtained through preprocessing and a quantity of primary colors of a display system.

For example, when image data of n channels is obtained through preprocessing, and a display system is a system with m primary colors, a corresponding CCM is an m×n matrix, where m and n are positive integers.

For example, when image data of three channels is obtained through preprocessing, and a display system is a system with three primary colors, a corresponding CCM is a 3×3 matrix.

For a manner of obtaining the CCM in this embodiment of this application, refer to a manner of obtaining a 3×3 CCM in the conventional technology. Details are not described herein.

S3104: Perform gamma correction on images obtained through color restoration.

In this embodiment of this application, if an $i^{th}$ image in the n narrowband images obtained through preprocessing is denoted as a matrix Ai, and a matrix used for performing white balance processing on the $i^{th}$ image is denoted as $awb_i$, an example mathematical expression for performing white balance, color correction, and gamma correction on the n narrowband images obtained through preprocessing is as follows:

$$\begin{bmatrix} \lambda_1 \\ \lambda_2 \\ \lambda_3 \\ \cdots \\ \lambda_m \end{bmatrix}_{out} =$$

$$\left( \begin{bmatrix} a_{11} & a_{12} & a_{13} & \cdots & a_{1n} \\ a_{21} & a_{22} & a_{23} & \cdots & a_{2n} \\ a_{31} & a_{32} & a_{33} & \cdots & a_{3n} \\ \cdots & \cdots & \cdots & \cdots & \cdots \\ a_{m1} & a_{m2} & a_{m3} & \cdots & a_{mn} \end{bmatrix} \begin{bmatrix} awb_1 & 0 & 0 & \cdots & 0 \\ 0 & awb_2 & 0 & \cdots & 0 \\ 0 & 0 & 0 & \cdots & 0 \\ \cdots & \cdots & \cdots & \cdots & \cdots \\ 0 & 0 & 0 & \cdots & awb_n \end{bmatrix} \begin{bmatrix} \lambda_1 \\ \lambda_2 \\ \lambda_3 \\ \cdots \\ \lambda_n \end{bmatrix}_{in} \right)^{\gamma},$$

where $\lambda_i$ in $$\begin{bmatrix} \lambda_1 \\ \lambda_2 \\ \lambda_3 \\ \cdots \\ \lambda_n \end{bmatrix}_{in}$$

represents an image data matrix of an $i^{th}$ channel in n channels obtained through preprocessing, i is a positive integer less than or equal to n, $$\begin{bmatrix} a_{11} & a_{12} & a_{13} & \cdots & a_{1n} \\ a_{21} & a_{22} & a_{23} & \cdots & a_{2n} \\ a_{31} & a_{32} & a_{33} & \cdots & a_{3n} \\ \cdots & \cdots & \cdots & \cdots & \cdots \\ a_{m1} & a_{m2} & a_{m3} & \cdots & a_{mn} \end{bmatrix}$$

represents the CCM, m represents a quantity of primary colors of a display system, $(\ )^{\gamma}$ represents gamma processing, $\lambda_j$ in $$\begin{bmatrix} \lambda_1 \\ \lambda_2 \\ \lambda_3 \\ \cdots \\ \lambda_m \end{bmatrix}_{out}$$

represents a $j^{th}$ primary color image data matrix in m primary color image data matrices obtained through white balance, color correction, and gamma correction, and j is a matrix less than or equal to m.

S3105: Perform 3D LUT correction on images obtained through gamma correction.

S3106: Perform post processing (post processing) on images obtained through 3D LUT correction. Post processing is similar to preprocessing, and details are not described herein again.

S3107: Display images obtained through post processing and/or store images obtained through post processing. Before the images are stored, the images may be first compressed to reduce storage space.

It may be understood that the operations shown in FIG. 31 are merely an example, and the imaging method provided in this application may include more or less operations, or similar operations may be performed.

Figure 32:
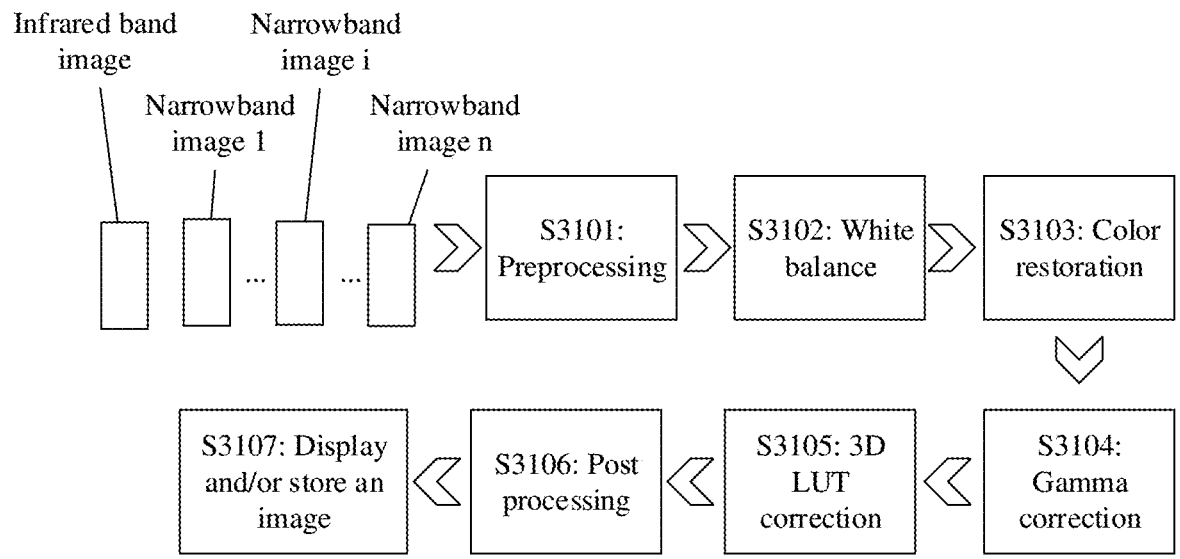
FIG. 32 is a schematic flowchart of an imaging method according to another embodiment of this application.

For example, as shown in FIG. 32, when an ISP performs color image processing, not only a narrowband image 1 to a narrowband image n are processed, but also an infrared (infrared radiation, IR) band image may be processed. The infrared band image may be used for grayscale imaging at low illuminance and used for more accurate color restoration of a visible light image.

This application further provides an imaging method, and the imaging method may include S2720 and S2730. Optionally, the imaging method may further include S2740. Optionally, the method may further include S2750. Optionally, the method may further include S2760 and/or S2780.

This application further provides a camera module 111 an imaging system shown in any one of FIG. 1 to FIG. 13.

This application further provides a multi-module camera. The multi-module camera includes a plurality of camera modules, and at least one of the camera modules is a camera module 111 an imaging system shown in any one of FIG. 1 to FIG. 13. Optionally, at least one of the camera modules may be a conventional camera module such as a camera module based on a Bayer array sensor or a Foveon (foveon) sensor. In this way, imaging quality can be improved, and binocular ranging can be jointly implemented.

Figure 28:
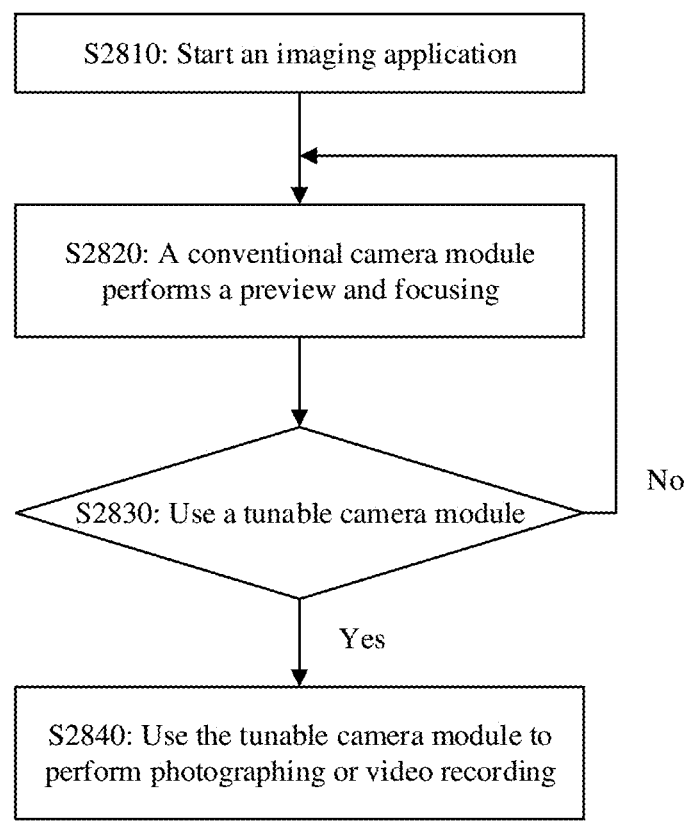
FIG. 28 is a schematic flowchart of an imaging method according to another embodiment of this application.

A schematic flowchart of an image method when the multi-module camera includes a conventional camera module and a camera module 111 an imaging system shown in any one of FIG. 1 to FIG. 13 is shown in FIG. 28. The camera module newly provided in this application is referred to as a tunable camera module.

S2810: Start an imaging application. For this step, refer to S2710.

S2820: Start the conventional camera module to perform a preview and focusing. For this step, refer to the conventional technology.

S2830: Determine whether to use the tunable camera module to perform photographing or video recording; and if yes, perform S2840; otherwise, repeatedly perform S2850.

S2840: Use the tunable camera module to perform photographing or video recording. For a specific implementation of this step, refer to S2720 to S2780 in the imaging method shown in FIG. 27.

This application further provides an imaging apparatus. The imaging apparatus includes a processing module 111 an imaging system shown in any one of FIG. 1 to FIG. 13, and may even include a storage module and/or a display module 111 the imaging system.

This application further provides a terminal device. The terminal device includes an imaging system shown in any one of FIG. 1 to FIG. 13.

This application further provides a mode setting method. The method includes: displaying a mode selection interface, where the mode selection interface includes a plurality of mode options; determining, based on input information of a user in the mode selection interface, a mode selected by the user, where for example, a mode corresponding to an option tapped by the user is the mode selected by the user; and setting a spectral mode based on the mode selected by the user. Different spectral modes correspond to optical signals of different bands.

This application further provides a method for adjusting a spectral mode of a camera module. The method includes: receiving indication information used to indicate to set the spectral mode of the camera module; and outputting mode information of each of a plurality of spectral modes in response to the indication information, where the mode information of each spectral mode includes name information of the spectral mode.

In different spectral modes in the plurality of spectral modes, filter channels of the camera module are different. For example, the plurality of spectral modes include but are not limited to a normal mode, a high-precision mode, a dark mode, and a print mode. Generally, a user selects the normal mode by default.

In the normal mode, a tunable filter uses a same filtering policy as a conventional Bayer filter, and uses red, green, and blue channels for filtering. In the high-precision mode, the tunable filter uses at least four channels for filtering, and spectrum fineness is greater than that of the conventional Bayer filter. In the dark mode, a filter channel of the tunable filter usually includes at least one channel that is wider than that of an RGB monochrome band, for example, RYB and RWB. Optionally, the plurality of spectral modes may further include an expert mode. The expert mode is mainly used for a requirement of a more professional population. In the expert mode, the user may define a quantity of filter channels and a band of each channel.

The method may further include: receiving second information, where the second information is used to indicate to set the spectral mode of the camera module to a target spectral mode in the plurality of spectral modes; and setting the spectral mode of the camera module to the target spectral mode in response to the second information. The target spectral mode is a spectral mode selected by the user from the plurality of spectral modes.

Figure 29:
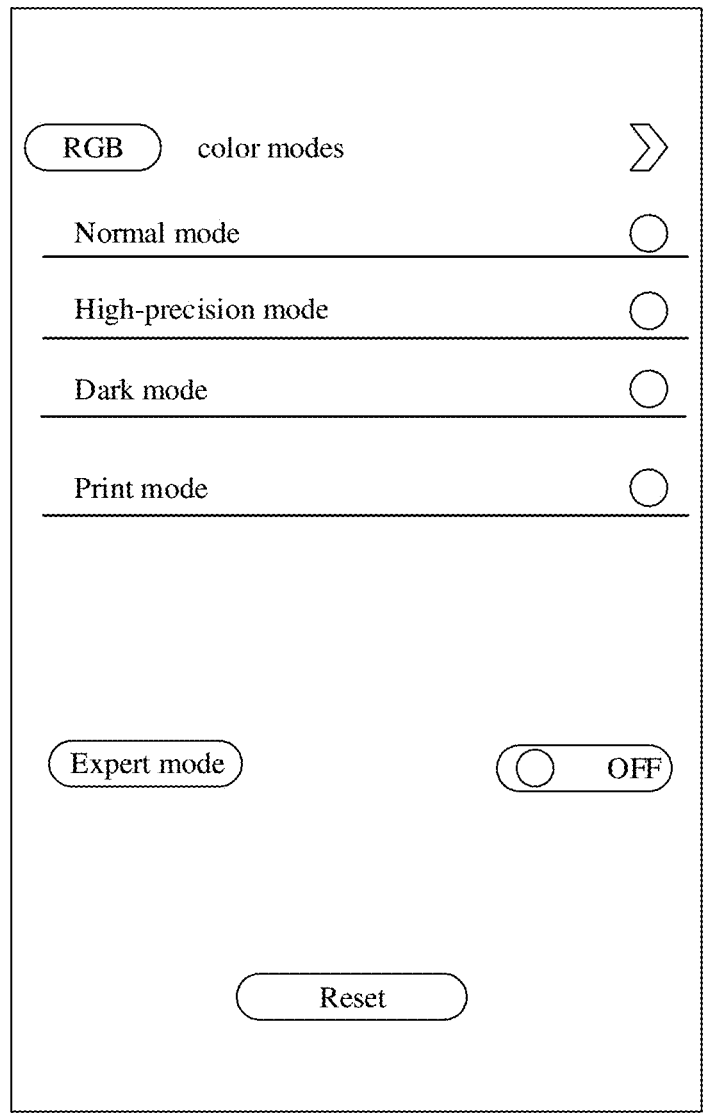
FIG. 29 is a schematic diagram of a mode selection interface according to an embodiment of this application.

In some designs, the mode information of the plurality of spectral modes may be output in the form of an interface. An example is shown in FIG. 29. Alternatively, the mode information of the plurality of spectral modes may be output in another manner, for example, a voice play manner.

In some designs, the mode information of each spectral mode may further include information about a band or a filter channel corresponding to the spectral mode.

FIG. 29 is a schematic diagram of a mode setting interface according to an embodiment of this application. The interface includes the following spectral mode options: a normal mode, a high-precision mode, a dark mode, a print mode, and an expert mode. A default mode is set to the normal mode. An icon after each mode name is a selectable icon. An icon selected by a user indicates that the user sets a spectral mode to a mode corresponding to the icon. The expert mode is controlled by a dual-selective switch, and the dual-selective switch is usually in an off state.

Figure 34:
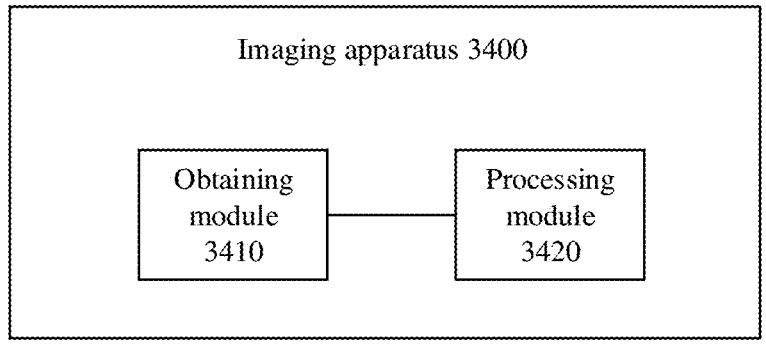
FIG. 34 is a schematic diagram of a structure of an imaging apparatus according to an embodiment of this application.

FIG. 34 is a schematic diagram of a structure of an imaging apparatus according to an embodiment of this application. The imaging apparatus 3400 includes an obtaining module 3410 and a processing module 3420. The imaging apparatus 3400 may be configured to implement any one of the foregoing imaging methods.

For example, the obtaining module 3410 is configured to obtain a plurality of groups of raw image data. The plurality of groups of raw image data are raw image data obtained by a camera module by performing optical-to-electrical conversion on target optical signals that are of different bands and that are collected at different times. The processing module 3420 is configured to perform color tuning processing on the plurality of groups of raw image data to obtain a color image. Different groups of raw image data in the plurality of groups of raw image data correspond to target optical signals of different bands.

In some possible implementations, the processing module 3420 is specifically configured to perform white balance, color restoration, gamma correction, and three-dimensional look-up processing on the plurality of groups of raw image data.

Figure 35:
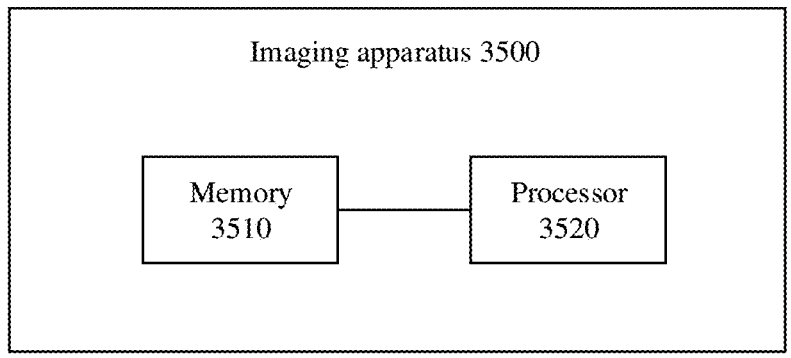
FIG. 35 is a schematic diagram of a structure of an imaging apparatus according to another embodiment of this application.

FIG. 35 is a schematic diagram of a structure of an imaging apparatus according to another embodiment of this application. The apparatus 3500 includes a memory 3510 and a processor 3520.

The memory 3510 is configured to store a program. The processor 3520 is configured to execute the program stored in the memory 3510. When the program stored in the memory 3510 is executed, the processor 3520 is configured to perform any one of the foregoing imaging methods.

Figure 36:
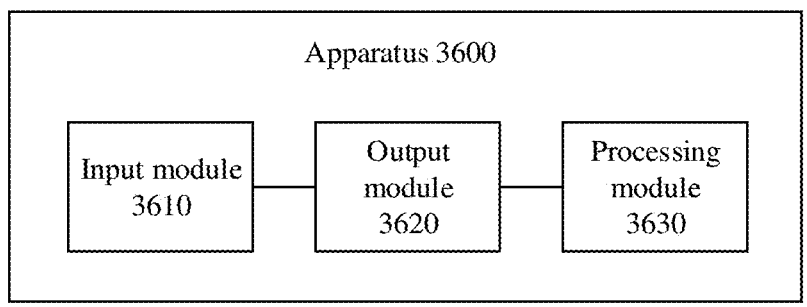
FIG. 36 is a schematic diagram of a structure of an apparatus for adjusting a spectral mode of a camera module according to an embodiment of this application.

FIG. 36 is a schematic diagram of a structure of an apparatus for adjusting a spectral mode of a camera module according to an embodiment of this application. The apparatus 3600 includes an input module 3610 and an output module 3620. Optionally, the apparatus 3600 may further include a processing module 3630. The apparatus 3600 may be configured to implement the foregoing method for adjusting a spectral mode of a camera module.

For example, the input module 3610 is configured to receive indication information used to indicate to set the spectral mode of the camera module. The output module 3620 is configured to output mode information of each of a plurality of spectral modes in response to the indication information. The mode information of each spectral mode includes name information of the spectral mode.

Optionally, the input module 3610 may be further configured to receive second information. The second information is used to indicate to set the spectral mode of the camera module to a target spectral mode in the plurality of spectral modes. The processing module 3630 is configured to set the spectral mode of the camera module to the target spectral mode in response to the second information. The target spectral mode is a spectral mode selected by a user from the plurality of spectral modes.

Figure 37:
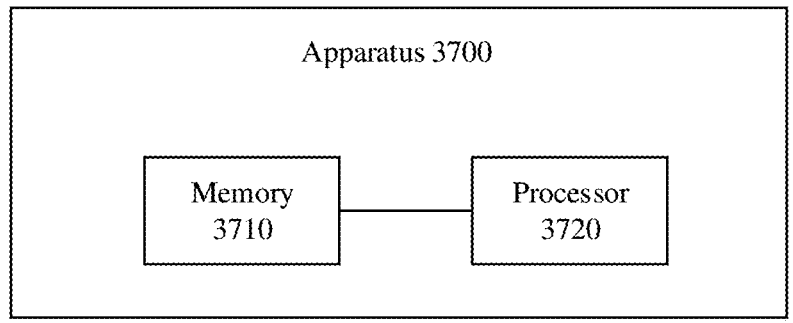
FIG. 37 is a schematic diagram of a structure of an apparatus for adjusting a spectral mode of a camera module according to another embodiment of this application.

FIG. 37 is a schematic diagram of a structure of an apparatus for adjusting a spectral mode of a camera module according to an embodiment of this application. The apparatus 3700 includes a memory 3710 and a processor 3720.

The memory 3710 is configured to store a program. The processor 3720 is configured to execute the program stored in the memory 3710. When the program stored in the memory 3710 is executed, the processor 3720 is configured to perform the foregoing method for adjusting a spectral mode of a camera module.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the aft may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

It should be understood that the processor in embodiments of this application may be a central processing unit (central processing unit, CPU), or the processor may be another genera-purpose processor, a digital signal processor (digital signal processor, DSP), an application-specific integrated circuit (application-specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

It should be understood that "/" in this application represents "or". The term "and/or" may include three parallel solutions. For example, "A and/or B" may include: "A", "B", and "A and B". It should be understood that "A or B" in this application may include: "A", "B", and "A and B".

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A camera, comprising a filter and a sensor, wherein
the filter is configured to output target optical signals of different bands in optical signals incident on the filter to a same pixel on the sensor at different times; and the sensor is configured to: convert the target optical signals incident on the sensor into electrical signals, and output the electrical signals;

wherein the filter comprises a first motor and a plurality of filters, the plurality of filters installed on a first electric wheel of the first motor, each of the plurality of filters is configured to output a target optical signal in the optical signals incident on the filter, and bands of target optical signals output by different filters in the plurality of filters are different; and the first motor is configured to move, at different times, different filters in the plurality of filters with the first electric wheel of the first motor to target positions at which the optical signals are received; or wherein the filter comprises a second motor and a linear graded interferometric filter, the linear graded interferometric filter fastened to a second electric wheel of the second motor, the second motor is configured to move, at different times, different parts of the linear graded interferometric filter with the second electric wheel of the second motor to target positions at which the optical signals are received, and bands of target optical signals output by the different parts of the linear graded interferometric filter fail for passing the linear graded interferometric filter.

2. The camera according to claim 1, wherein the filter is continuously tunable from visible light to infrared light.

3. The camera according to claim 1, wherein the filter comprises two two-sided reflectors and a third motor;

the third motor is configured to adjust a distance between the two two-sided reflectors, so that distances between the two two-sided reflectors are different at different times; and the two two-sided reflectors are configured to: obtain, through filtering, a first target optical signal incident on one of the two two-sided reflectors, and output the first target optical signal from the other one of the two two-sided reflectors, and bands of the first target optical signal are different when the distances between the two two-sided reflectors are different.

4. The camera according to claim 1, wherein the filter comprises a liquid crystal tunable filter.

5. The camera according to claim 4, wherein the filter is one of filters of the camera.

6. The camera according to claim 1, wherein the filter comprises an acousto-optic tunable filter.

7. The camera according to claim 1, wherein the filter further comprises an infrared cut-off filter, and the infrared cut-off filter is configured to filter out infrared light in each target optical signal before each target optical signal is incident on the sensor.

8. The camera according claim 1, wherein the camera further comprises a first lens; and the first lens is configured to output an optical signal incident on the first lens to the filter.

9. The camera according to claim 8, wherein the first lens comprises one or more of following: a plastic lens, a glass lens, a diffractive optical element (DOE), a metalens, or a lens.

10. The camera according to claim 8, wherein the camera further comprises a fourth motor; and the fourth motor is configured to control the first lens or the sensor to move, to implement a focusing function or an image stabilization function of the camera.

11. The camera according to claim 8, wherein the camera further comprises a second lens, and the second lens is located between the filter and the sensor; and the second lens is configured to: output each target optical signal output by the filter to the sensor, and increase coverage of each target optical signal on the sensor.

12. The camera according to claim 11, wherein the second lens comprises one or more of: a plastic lens, a glass lens, a diffractive optical element DOE, a metalens, or a lens.

13. The camera according to claim 1, wherein the camera further comprises a second lens, and the second lens is located between the filter and the sensor; and the second lens is configured to: output each target optical signal output by the filter to the sensor, and increase coverage of each target optical signal on the sensor.

14. The camera according to claim 13, wherein the camera further comprises a fifth motor; and the fifth motor is configured to control the second lens or the sensor to move, to implement a focusing function or an image stabilization function of the camera.

15. The camera according to claim 13, wherein the camera further comprises a first lens; and the first lens is configured to output an optical signal incident on the first lens to a target position on the filter.

16. The camera according to claim 1, wherein the sensor comprises a full-band pass sensor allowing at least visible light passing.

17. An imaging method, comprising:

obtaining a plurality of groups of raw image data, wherein the plurality of groups of raw image data are raw image data obtained by a camera by performing optical-to-electrical conversion on target optical signals, the target optical signals being of different bands and collected at different times by the camera; and performing color tuning processing on the plurality of groups of raw image data to obtain a color image, wherein different groups of raw image data in the plurality of groups of raw image data correspond to the target optical signals of the different bands, wherein the performing the color tuning processing on the plurality of groups of raw image data comprises:

performing white balance, color restoration, gamma correction, and three-dimensional look-up processing on the plurality of groups of raw image data.

18. A method comprising:

receiving first information, wherein the first information indicates to set a spectral mode of a camera; and outputting mode information of each of a plurality of spectral modes in response to the first information, wherein the mode information of each of the plurality of spectral modes comprises corresponding name information of a corresponding spectral mode, and wherein corresponding filter channels of the camera are different in each different spectral mode of the plurality of spectral modes.

19. The method according to claim 18, wherein the plurality of spectral modes comprise a normal mode, a high-precision mode, a dark mode, a print mode, and an expert mode, wherein at least four filter channels are used in the high-precision mode, and spectrum fineness of the high-precision mode is finer than spectrum fineness of the normal mode, and wherein a filter channel in the dark mode includes at least one channel wider than a filter of an RGB monochrome band.

20. The camera according to claim 1, wherein the first motor is configured to move, the plurality of filters with the first electric wheel of the first motor such that each filter of the plurality of filters, when being driven by the first electric wheel of the first motor, alternately covers an optical aperture of the camera, a position of the optical aperture being fixed relatively to the camera.

\* \* \* \* \*